(12) United States Patent
Chen et al.

(10) Patent No.: US 9,351,293 B2
(45) Date of Patent: May 24, 2016

(54) MULTIPLE CARRIER INDICATION AND DOWNLINK CONTROL INFORMATION INTERACTION

(75) Inventors: Wanshi Chen, San Diego, CA (US); Tao Luo, San Diego, CA (US); Aamod Dinkar Khandekar, San Diego, CA (US); Juan Montojo, San Diego, CA (US); Peter Gaal, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1433 days.

(21) Appl. No.: 12/877,694

(22) Filed: Sep. 8, 2010

(65) Prior Publication Data

US 2011/0070845 A1   Mar. 24, 2011

Related U.S. Application Data

(60) Provisional application No. 61/241,816, filed on Sep. 11, 2009, provisional application No. 61/248,816, filed on Oct. 5, 2009.

(51) Int. Cl.
*H04W 72/04* (2009.01)
*H04L 5/00* (2006.01)
*H04L 25/03* (2006.01)
*H04W 72/12* (2009.01)

(52) U.S. Cl.
CPC .......... *H04W 72/042* (2013.01); *H04L 5/001* (2013.01); *H04L 5/0023* (2013.01); *H04L 5/0053* (2013.01); *H04L 5/0094* (2013.01); *H04L 25/03866* (2013.01); *H04W 72/1289* (2013.01)

(58) Field of Classification Search
None
See application file for complete search history.

(56) References Cited

U.S. PATENT DOCUMENTS

| 7,733,827 | B2 | 6/2010 | Kim et al. |
| 8,223,712 | B2 | 7/2012 | Kim et al. |
| 8,295,868 | B2 | 10/2012 | Zhang et al. |
| 8,934,417 | B2* | 1/2015 | Nory ................ H04W 72/1289 370/329 |

(Continued)

FOREIGN PATENT DOCUMENTS

| CN | 101465720 A | 6/2009 |
| CN | 101505498 A | 8/2009 |

(Continued)

OTHER PUBLICATIONS

ZTE: "Considerations on Carrier Indicator" 3GPP Draft, R1-0923207. Considerations on Carrier Indicator, 3$^{rd}$ Generation Partnership Project (3GPP), Mobile Competence Centre, 650, Route Des Lecioles, F-06921 Sophia-Antipolis Cedex, France, no. Shenzhen, China, Aug. 19, 2009.*

(Continued)

*Primary Examiner* — Andrew Oh
(74) *Attorney, Agent, or Firm* — Steven A. Raney

(57) ABSTRACT

Methods, systems, apparatus and computer program products are provided to facilitate the configuration and allocation of cross-carrier control information associated with transmissions of a wireless communication system. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

80 Claims, 12 Drawing Sheets

(56) References Cited

U.S. PATENT DOCUMENTS

| | | | |
|---|---|---|---|
| 8,989,208 B2* | 3/2015 | Chen | H04L 5/0053 370/329 |
| 2004/0038684 A1 | 2/2004 | Sugaya | |
| 2005/0053036 A1 | 3/2005 | Takeda | |
| 2005/0096076 A1 | 5/2005 | Gu et al. | |
| 2005/0176437 A1 | 8/2005 | Mir | |
| 2008/0214224 A1 | 9/2008 | Ostman et al. | |
| 2009/0088148 A1 | 4/2009 | Chung et al. | |
| 2009/0219870 A1 | 9/2009 | Wengerter et al. | |
| 2010/0046412 A1* | 2/2010 | Varadarajan | H04L 5/003 370/312 |
| 2010/0215011 A1 | 8/2010 | Pan et al. | |
| 2010/0227638 A1 | 9/2010 | Park et al. | |
| 2010/0232373 A1* | 9/2010 | Nory | H04W 72/1289 370/329 |
| 2010/0254329 A1 | 10/2010 | Pan et al. | |
| 2010/0273515 A1 | 10/2010 | Fabien et al. | |
| 2010/0279628 A1* | 11/2010 | Love | H04L 5/0091 455/70 |
| 2010/0296473 A1* | 11/2010 | Kim | H04L 5/0007 370/329 |
| 2010/0323744 A1 | 12/2010 | Kim et al. | |
| 2011/0014922 A1 | 1/2011 | Jen | |
| 2011/0021154 A1 | 1/2011 | Marinier et al. | |
| 2011/0021228 A1* | 1/2011 | Kim et al. | 455/507 |
| 2011/0038275 A1* | 2/2011 | Kim | H04W 48/16 370/252 |
| 2011/0038331 A1 | 2/2011 | Chmiel et al. | |
| 2011/0044222 A1 | 2/2011 | Gerstenberger et al. | |
| 2011/0044239 A1* | 2/2011 | Cai | H04W 72/042 370/328 |
| 2011/0044259 A1* | 2/2011 | Nimbalker et al. | 370/329 |
| 2011/0051681 A1* | 3/2011 | Ahn | H04L 5/0094 370/330 |
| 2011/0064042 A1* | 3/2011 | Kim | H04L 5/1469 370/329 |
| 2011/0070845 A1* | 3/2011 | Chen | H04L 5/001 455/91 |
| 2011/0081936 A1 | 4/2011 | Haim et al. | |
| 2011/0081939 A1 | 4/2011 | Damnjanovic et al. | |
| 2011/0081940 A1 | 4/2011 | Gerstenberger et al. | |
| 2011/0110316 A1* | 5/2011 | Chen | H04L 5/0053 370/329 |
| 2011/0110441 A1* | 5/2011 | Chen | H04L 5/0007 375/260 |
| 2011/0134774 A1 | 6/2011 | Pelletier et al. | |
| 2011/0134877 A1* | 6/2011 | Noh | H04L 5/001 370/329 |
| 2011/0151913 A1* | 6/2011 | Forster | H04W 4/20 455/509 |
| 2011/0205995 A1* | 8/2011 | Grovlen | H04L 5/0007 370/329 |
| 2011/0222629 A1* | 9/2011 | Lindh | H04B 7/0615 375/296 |
| 2011/0235607 A1* | 9/2011 | Haustein | H04L 5/0048 370/329 |
| 2011/0250918 A1 | 10/2011 | Jen | |
| 2011/0280127 A1* | 11/2011 | Raaf | H04L 45/125 370/230 |
| 2011/0299489 A1 | 12/2011 | Kim et al. | |
| 2011/0319121 A1 | 12/2011 | Jen | |
| 2012/0009923 A1 | 1/2012 | Chen et al. | |
| 2012/0044921 A1* | 2/2012 | Chung | H04L 5/0053 370/338 |
| 2012/0046064 A1 | 2/2012 | Baldemair et al. | |
| 2012/0078933 A1* | 3/2012 | Kim | H04L 5/0007 707/758 |
| 2012/0127946 A1 | 5/2012 | Nishio et al. | |
| 2012/0163437 A1* | 6/2012 | Frederiksen | H04L 5/001 375/224 |
| 2012/0176982 A1* | 7/2012 | Zirwas | H04B 7/024 370/329 |
| 2012/0188962 A1* | 7/2012 | Gao | H04B 7/0434 370/329 |
| 2012/0208583 A1 | 8/2012 | Chung et al. | |
| 2013/0153298 A1 | 6/2013 | Pietraski et al. | |
| 2013/0286990 A1 | 10/2013 | Park et al. | |
| 2015/0092690 A1* | 4/2015 | Seo | H04W 72/042 370/329 |

FOREIGN PATENT DOCUMENTS

| | | |
|---|---|---|
| CN | 101998611 A | 3/2011 |
| EP | 1895697 A1 | 3/2008 |
| JP | 2003152671 A | 5/2003 |
| JP | 2005045504 A | 2/2005 |
| RU | 2313912 C2 | 12/2007 |
| RU | 2319307 C2 | 3/2008 |
| WO | WO-2008083804 A2 | 7/2008 |
| WO | WO-2008157797 | 12/2008 |
| WO | WO-2009021012 A2 | 2/2009 |
| WO | WO-2009041779 A1 | 4/2009 |
| WO | WO-2009048404 A1 | 4/2009 |
| WO | WO-2009057283 A1 | 5/2009 |
| WO | 2009099271 A1 | 8/2009 |
| WO | 2011021379 A1 | 2/2011 |

OTHER PUBLICATIONS

3rd Generation Partnership Project; Technical Specification Group Radio Access Network; Evolved Universal Terrestrial Radio Access (E-UTRA); Physical layer procedures (Release 8) 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V8.7.0, May 1, 2009, pp. 1-81, XP050377562 the whole document.

3GPP TSG RAN WG #58 bis, "Qualcomm Europe UL Power Control Multicarrier operation", R1-094209, Oct. 16, 2009.

CATT: "Carrier indicator for LTE-A", 3GPP Draft; R1-094538, 3rd Generation Partnership Project (3GPP), Mobile Competence Centre ; 650, Route Des Lucioles ; F-06921 Sophia-Antipolis Cedex ; France, no. Jeju; Nov. 9, 2009, XP050388953.

MCC Support: "Draft Report of 3GPP TSG RAN WG1 #59 v0.2.0 (Jeju, South Korea, Nov. 9-13, 2009)", 3GPP Draft; Draft ReportWG1#59_V020, 3rd Generation Partnership Project (3GPP), Mobile Competence Centre ; 650, Route Des Lucioles ; F-06921 Sophia-Antipolis Cedex ; France, vol. RAN WG1, no. Valencia, Spain; Jan. 18, 2010, Nov. 19, 2009, XP050448942, p. 22-p. 38.

Panasonic: "Discussion on PDCCH with carrier indicator", 3GPP Draft; R1-094496, 3rd Generation Partnership Project (3GPP), Mobile Competence Centre, Nov. 9, 2009, pp. 1-3, XP050388917, France [retrieved on Nov. 2, 2009].

ZTE: "PDCCH designing issues for LTE-A", 3GPP Draft; R1-094736 PDCCH Designing issues for LTE-A, 3rd Generation Partnership Project (3GPP), Mobile Competence Centre ; 650, Route Des Lucioles ; F-06921 Sophia-Antipolis Cedex ; France, no. Jeju; Nov. 9, 2009, XP050389133.

3GPP: "3rd Generation Partnership Project, Technical Specification Group Radio Access Network, Evolved Universal Terrestrial Radio Access (E-UTRA), Physical layer procedures (Release 8)" 3GPP Draft, Draft36213-880, 3rd Generation Partnership Project (3GPP), Mobile Competence Centre , 650, Route Des Lucioles , F-06921 Sophia-Antipolis Cedex , France, Sep. 1, 2009, XP050388082.

3rd Generation Partnership Project; Technical Specification Group Raciio Access Network; Radio Resource Control (RRC); Protocol Specification (Release 8 ) , 3GPP Standard; 3GPP TS 25.331, 3rd Generation Partnership Project (3GPP), Mobile Competence Centre ; 650, Route Des Lucioles ; F-06921 Sophia-Antipolis Cedex ; France, No. V8.7.0, Jun. 1, 2009, pp. 1-1685, XP050368027, p. 575-pp. 579, 777 pp. 839-841.

International Search Report and Written Opinion—PCT/US2010/048521, International Search Authority—European Patent Office—Mar. 21, 2011.

Qualcomm Europe: "Interpreting the Carrier Indicator Field" 3GPP Draft, R1-094206 Interpretation of the Carrier Indicator Field, 3rd Generation Partnership Project (3GPP), Mobile Competence Centre , 650, Route Des Lucioles , F-06921 Sophia-Antipolis Cedex , France, no. Miyazaki, Oct. 12, 2009, XP050388676.

(56) References Cited

OTHER PUBLICATIONS

Qualcomm Europe: "UE Transmitter characteristics impact due to DC-HSUPA", 3GPP Draft; R4-091680_UE_TX_DC_HSUPA, 3rd Generation Partnership Project (3GPP), Mobile Competence Centre ; 650, Route Des Lucioles ; F-06921 Sophia-Antipolis Cedex ; France, no. San Francisco; Apr. 27, 2009, XP050342428.

Research in Motion et al.,"Carrier Indication for Carrier Aggregation" 3GPP Draft, R1-092417 (RIM-Carrier Indication for CA), 3rd Generation Partnership Project (3GPP), Mobile Competence Centre , 650, Route Des Lucioles , F-06921 Sophia-Antipolis Cedex , France, no. Los Angeles, USA, Jun. 24, 2009, XP050350931.

ZTE: "Considerations on Carrier Indicator" 3GPP Draft, R1-093207 Considerations on Carrier Indicator, 3rd Generation Partnership Project (3GPP), Mobile Competence Centre , 650, Route Des Lucioles , F-06921 Sophia-Antipolis Cedex , France, no. Shenzhen, China, Aug. 19, 2009, XP050351560.

Ericsson, "Carrier aggregation in LTE-Advanced", 3GPP Draft, R1-082468, 3rd Generation Partnership Project (3GPP), Mobile Competence Centre, 650, Route Des Lucioles, F-06921 Sophia-Antipolis Cedex, France, vol. RAN WGI, no. Warsaw, Poland, Jun. 30, 2008, pp. 1-6, XP050110739.

Research in Motion: "Carrier Indication for Carrier Aggregation," 3GPP TSG RAN WG1 Meeting #57b, R1-092417, Jun. 29, 2009, 3 pages.

Taiwan Search Report—TW099130701—TIPO—Jan. 23, 2014.

ZTE: "Considerations on Carrier Indicator," 3GPP TSG-RAN WG1 meeting #58, R1-093207, Aug. 24, 2009, 4 pages.

ZTE: "Primary and Secondary PDCCH Design for LTE-A", 3GPP Draft; R1-091707, 3rd Generation Partnership Project (3GPP), Mobile Competence Centre, May 8, 2009, pp. 1-12.

3GPP TSG RAN WG1 Meeting #58, R1-093282, "ASUSTeK: Multi-Carrier UL power control for LTE-A", Aug. 28, 2009, pp. 1-40.

Alcatel-Lucent, "Control Channel Association for DL/UL Asymmetrical Carrier Aggregation," 3GPP TSG-RAN WG1 #58, R1-093361, Shenzhen, China, Aug. 24-28, 2009, 5 Pages.

Philips et al., "Corrections to Transmission Modes," 3GPP TSG-RAN WG1 Meeting #55bis, R1-090466, Ljubljana, Slovenia, Jan. 12-16, 2009, 25 Pages.

Texas Instruments: "Views on Cross-Carrier Resource Assignment," 3GPP TSG RAN WG1 # 58 R1-093595, Shenzhen, China, Aug. 24-Aug. 28, 2009, 2 pages.

* cited by examiner

MULTIPLE CARRIER INDICATION AND DOWNLINK CONTROL INFORMATION INTERACTION

The present application claims priority to U.S. Provisional Patent Application Ser. No. 61/241,816, entitled "MULTIPLE CARRIER INDICATION AND DOWNLINK CONTROL INFORMATION INTERACTION," filed Sep. 11, 2009, the entirety of which is hereby incorporated by reference. The present application claims priority to U.S. Provisional Application Ser. No. 61/248,816, entitled "DOWNLINK CONTROL INFORMATION FOR MULTI-CARRIER OPERATION," filed Oct. 5, 2009, the entirety of which is hereby incorporated by reference.

FIELD OF INVENTION

The present disclosure relates generally to the field of wireless communications and, more particularly, to improving the ability of a wireless communication system to provide control information in a multi-carrier environment.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal, or user equipment (UE), communicates with one or more base stations through transmissions on the forward and reverse links. The forward link (or downlink) refers to the communication link from the base stations to the user equipment, and the reverse link (or uplink) refers to the communication link from the user equipment to the base stations.

SUMMARY

The disclosed embodiments relate to systems, methods, apparatus and computer program products that facilitate the interaction of multi-carrier indicators and downlink control information in a wireless communication system.

In one aspect of the disclosed embodiments, a method includes receiving a plurality of component carriers configured for a wireless communication device, where the plurality of component carriers includes a plurality of search spaces having one or more common search spaces and a plurality of user-specific search spaces. The method further includes receiving a cross-carrier indicator, where the cross-carrier indicator is configured to enable cross-carrier signaling for a first component carrier. The method also includes determining whether the cross-carrier indicator is present in a control information format carried on a second component carrier, based on an association of the control information format with a search space on the second component carrier.

In one embodiment, the common search space includes two downlink control information (DCI) formats without carrier indicators, and the plurality of user-specific search spaces includes DCI formats, of at least two different sizes, with carrier indicators, where cross-carrier control is enabled for unicast traffic via carrier indicators and cross-carrier control is not enabled for broadcast traffic via carrier indicators.

In one embodiment, the common search space includes DCI format(s) of a first size with a carrier indicator and DCI format(s) of a second size without a carrier indicator, and the plurality of user-specific search spaces includes DCI formats of at least two different sizes with carrier indicators, wherein cross-carrier control is enabled for unicast traffic via carrier indicators and not enabled for broadcast traffic via carrier indicators.

In one embodiment, the common search space includes DCI formats of two different sizes with carrier indicators and the plurality of user-specific search spaces includes DCI formats of at least two different sizes with carrier indicators, wherein cross-carrier control is enabled for unicast traffic and broadcast traffic via carrier indicators.

In one embodiment, the common search space includes DCI format(s) of a first size with a carrier indicator and DCI format(s) of a second size without a carrier indicator, and the plurality of user-specific search spaces includes two DCI formats with carrier indicators, wherein cross-carrier control is enabled for unicast traffic and broadcast traffic via carrier indicators.

In one embodiment, the common search space includes DCI formats of three different sizes, comprising DCI formats of two sizes with carrier indicators and DCI format(s) of a third size without a carrier indicator, and the plurality of user-specific search spaces includes DCI formats of at least two different sizes with carrier indicators, providing backward compatibility with LTE Rel-8 broadcast traffic and unicast traffic.

In one embodiment, the common search space includes DCI formats of four different sizes, comprising DCI formats of a first two sizes with a carrier indicator and DCI formats of a second two sizes without a carrier indicator, and the plurality of user-specific search spaces includes DCI formats at least two different sizes with carrier indicators, providing backward compatibility with LTE Rel-8 broadcast traffic and unicast traffic.

In one disclosed embodiment, a method in a wireless communication system includes formatting control information, in a control channel of a communications carrier, with a cross-carrier control indicator, and scrambling the CRC of the control information with a scrambling code, wherein the scrambling code is selected based on a format of the control information and a location of the control information within a plurality of search spaces in the control channel.

In another aspect, a first plurality of control information formats is associated with a first scrambling code and the at least one common search space, and a second plurality of control information formats, including the first plurality of control information formats, is associated with a second scrambling code and the plurality of user-specific search spaces, where the second scrambling code is different from the first scrambling code.

In another disclosed embodiment, a method in a wireless communication device includes searching a plurality of search spaces in a control channel of a communications carrier for scrambled control information, blind-decoding the plurality of search spaces with a plurality of descrambling codes to extract the control information, and determining the presence of a cross-carrier control indicator based on a format of the control information and a location of the control information in the plurality of search spaces.

In another aspect, a first plurality of control information formats is associated with a first descrambling code and at least one common search space, and a second plurality of control information formats, including the first plurality of control information formats, is associated with a second descrambling code and the plurality of user-specific search spaces, where the second descrambling code is different from the first descrambling code.

Other disclosed embodiments include apparatus and computer program products for performing the disclosed methods.

BRIEF DESCRIPTION OF THE DRAWINGS

Various disclosed embodiments are illustrated by way of example, and not of limitation, by referring to the accompanying drawings, in which.

DETAILED DESCRIPTION

Figure 1:
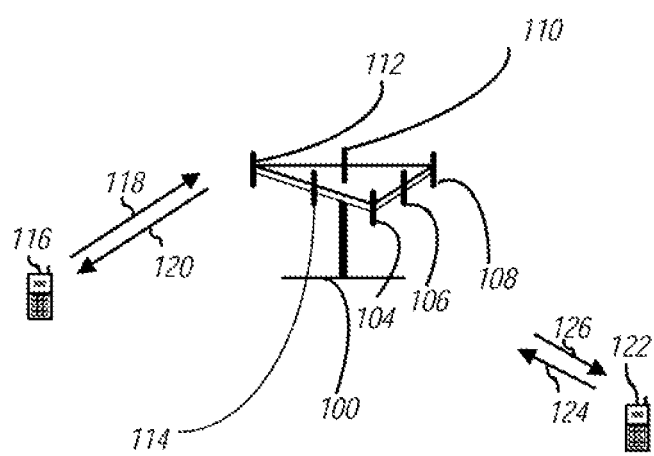
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that, the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel.

Figure 2:
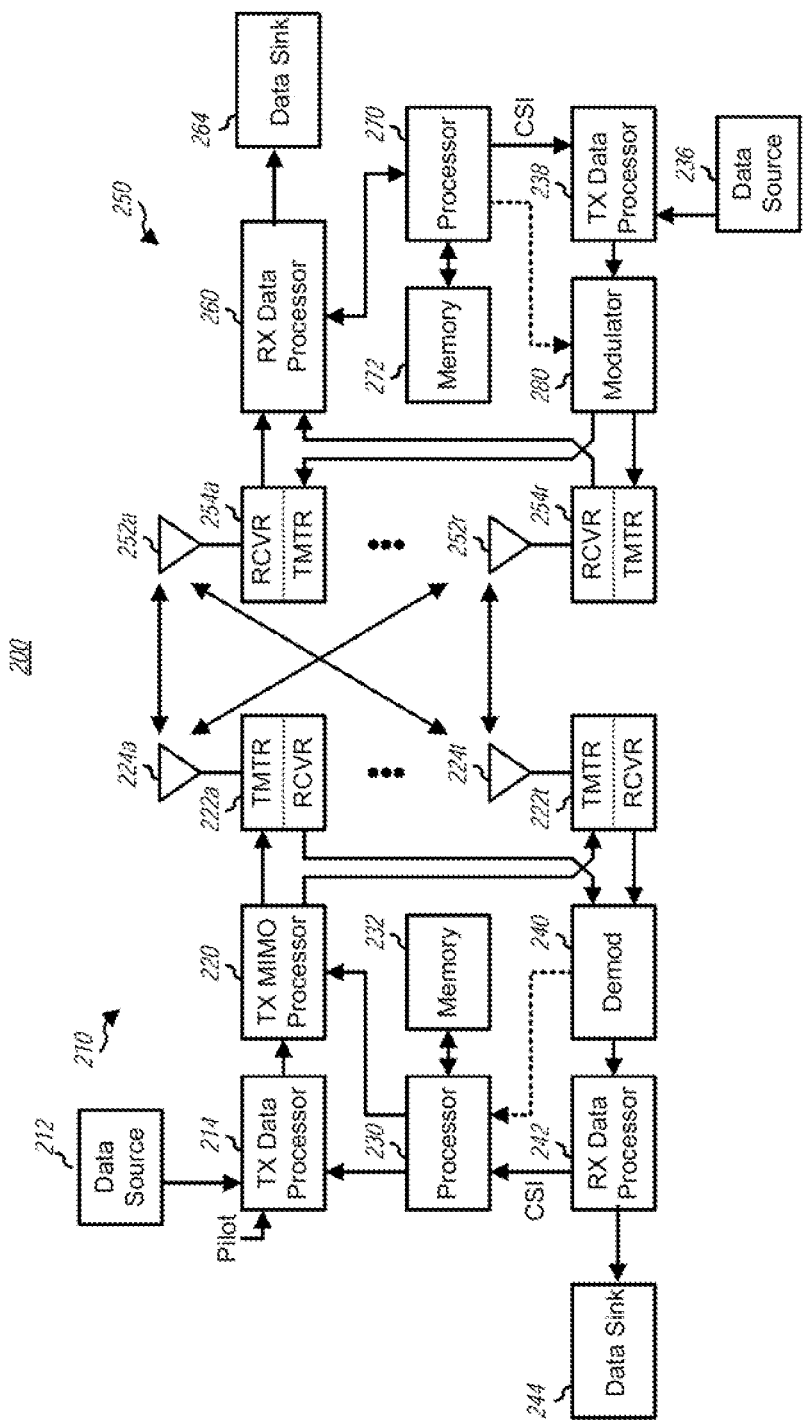
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MEMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

In LTE systems, the physical downlink shared channel (PDCCH) carries the data and signaling information to the user equipment; while the physical downlink control channel (PDCCH) carries a message known as downlink control information (DCI). The DCI includes information regarding the downlink scheduling assignments, uplink resource grants, transmission scheme, uplink power control, hybrid automatic return repeat request (HARQ) information, modulation and coding schemes (MCS) and other information. A DCI can be UE-specific (dedicated) or cell-specific (common) and placed in different dedicated and common search spaces within the PDCCH depending on the format of the DCI. A user equipment attempts to decode the DCI by performing a process known as a blind decode, during which a plurality of decode attempts are carried out in the search spaces until the DCI is detected.

The size of the DCI messages can differ depending on the type and amount of information that is carried by the DCI. For example, if spatial multiplexing is supported, the size of the DCI message is larger compared to scenarios where contiguous frequency allocations are made. Similarly, for a system that employs MIMO, the DCI must include additional signaling information that is not needed for systems that do not utilize MIMO. Accordingly, the DCI has been categorized in different formats that are suited for different configurations. Table 1 summarizes the DCI formats that are listed as part of LTE Rel-8 specifications. It should be noted that the disclosed embodiments can also be implemented in conjunction with other DCI formats and/or sizes.

TABLE 1

Exemplary DCI Formats

| DCI Format | Purpose | Number of Bits (10 MHz) |
|---|---|---|
| 0 | Uplink Resource Grant | 42 |
| 1 | Downlink Resource Assignment - single codeword | 47 |
| 1A | Downlink Resource Assignment - single codeword/compact format | 42 |
| 1B | Downlink Resource Assignment - rank-1 transmission | 46 |
| 1C | Downlink Resource Assignment - very compact format | 26 |
| 1D | Downlink Resource Assignment - multi-user MIMO | 46 |
| 2 | Downlink Resource Assignment - closed-loop MIMO | 62 |
| 2A | Downlink Resource Assignment - open-loop MIMO | 58 |
| 3 | Transmit Power Control Commands - PUCCH and PUSCH with 2-bit power adjustment | 42 |
| 3A | Transmit Power Control Commands - PUCCH and PUSCH with 1-bit power adjustment | 42 |

The size of a DCI format depends not only on the amount of information that is carried within the DCI message, but also on other factors such as the transmission bandwidth, the number of antenna ports, TDD or FDD operating mode, etc. For example, the exemplary sizes that are listed in Table 1 for different DCI formats are associated with a system bandwidth of 50 resource blocks, FDD, and four antennas at the eNodeB, corresponding to a 10 MHz bandwidth.

In order to simplify the decoding of the DCI messages at the user equipment, the LTE Rel-8 specifications also require that DCI format 0 (used for uplink grants) and format 1A (used for downlink resource assignment) to always be the same size. However, due to different information fields in DCI format 0 and DCI format 1A and, for example, bandwidth differences between the uplink and downlink channels, the size of a format 0 DCI and format 1A DCI message can differ. Therefore, in situations where DCI formats 0 and 1A have different sizes, the smaller of the two is padded with zeroes to produce same DCI message size. In order to differentiate between format 0 and format 1A DCI messages, a single bit in both formats is provided that signals the presence of either format 0 or format 1A.

It should be noted that in some systems, the DCI messages are also appended with cyclic redundancy check (CRC) bits to for error detection. The coded DCI bits are then mapped to control channel elements (CCEs) according to the DCI format. A PDCCH can carry DCI messages associated with multiple user equipments. A particular user equipment must, therefore, be able to recognize the DCI messages that are intended for that particular user equipment. To that end, a user equipment is assigned certain identifiers (e.g., a cell radio network temporary identifier—C-RNTI) that facilitate the detection of the DCI associated with that user equipment. To reduce signaling overhead, the CRC bits that are attached to each DCI payload are scrambled (e.g., masked) with the identifier (e.g., C-RNTI) associated with a particular user equipment and/or an identifier that is associated with a group of user equipments. In an operation known as a "blind decode," the user equipment can descramble (or de-mask) all potential DCI messages using its unique identifier, and perform a CRC check on the DCI payload. If the CRC check passes, the content of the control channel is declared valid for the user equipment, which can then process the DCI.

To reduce power consumption and overhead at the user equipment; a limited set of control channel element (CCE) locations can be specified, wherein the set of CCE locations include locations at which a DCI payload associated with a particular UE can be placed. In LTE Rel-8, a CCE consists of nine logically contiguous resource element groups (REGs), where each REG contains 4 resource elements (REs). Each RE is one frequency-time unit. CCEs can be aggregated at different levels (e.g., 1, 2, 4 and 8) depending on the DCI format and the system bandwidth. The set of CCE locations in which the user equipment can find its corresponding DCI messages are considered a search space. The search space can be partitioned into two regions: a common CCE region or search space and a UE-specific (dedicated) CCE region or search space. The common CCE region is monitored by all UEs served by an eNodeB and can include information such as paging information, system information, random access procedures and the like. The UE-specific CCE region includes user-specific control information and is configured individually for each user equipment.

Figure 3:
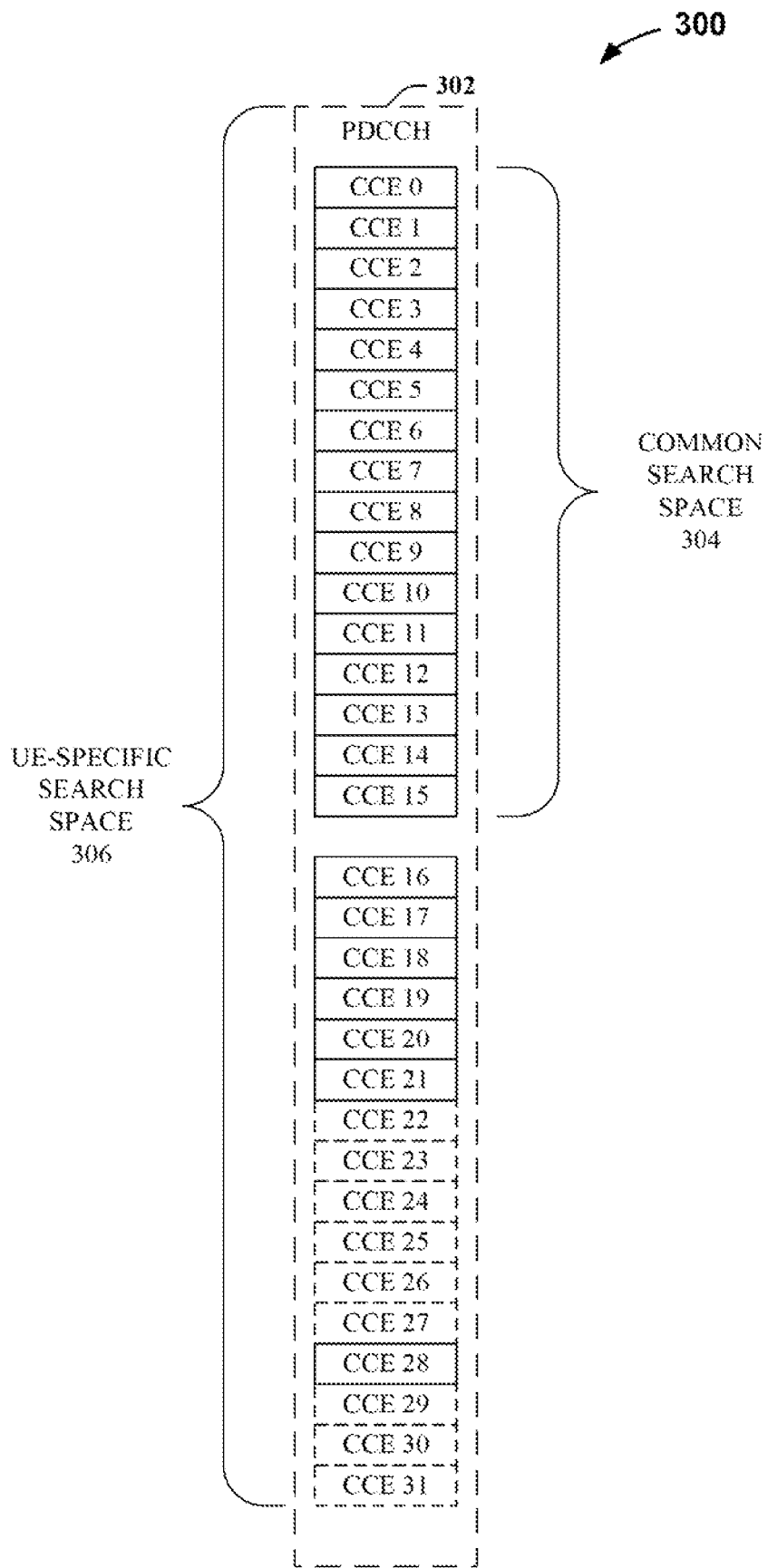
FIG. 3 illustrates exemplary search space.

FIG. 3 illustrates an exemplary search space 300 on a PDCCH 302 that is divided into a common search space 304 and a UE-specific search space. 306. It should be noted that while, for simplicity, the exemplary search space 302 of FIG. 3 is illustrated as a collection of 32 logically contiguous CCE blocks, it is understood that the disclosed embodiments can be implemented using a different number of CCEs. Each CCE contains a fixed number of resource elements in non-contiguous locations. Alternatively, the CCEs may be arranged in non-contiguous locations within the resource blocks of one or more downlink control channels. Moreover, the common search space 304 and the UE-specific search space 306 may span overlapping CCEs. CCEs are numbered consecutively. The common search space always starts from CCE 0, while UE specific search space has starting CCE indices that depend on the UE ID (e.g., C-RNTI), the subframe index, the CCE aggregation level and other random seeds.

In LTE Rel-8 systems, the number of CCEs, denoted by $N_{CCE}$, available for PDCCH can be determined based on the system bandwidth, the size of the control region, and the configuration of other control signals, etc. The set of CCEs for the common search space ranges from 0 to min$\{16, N_{CCE}-1\}$. For all the UEs, the set of CCEs for the UE-specific search space ranges from 0 to $N_{CCE}-1$, a superset of those for the common search space. For a specific UE, the set of CCEs for the UE is a subset of the entire set within the range from CCE 0 to CCE $N_{CCE}-1$, depending on the configured identifier and other factors. In the example in FIG. 3, $N_{CCE=32}$.

Figure 4:
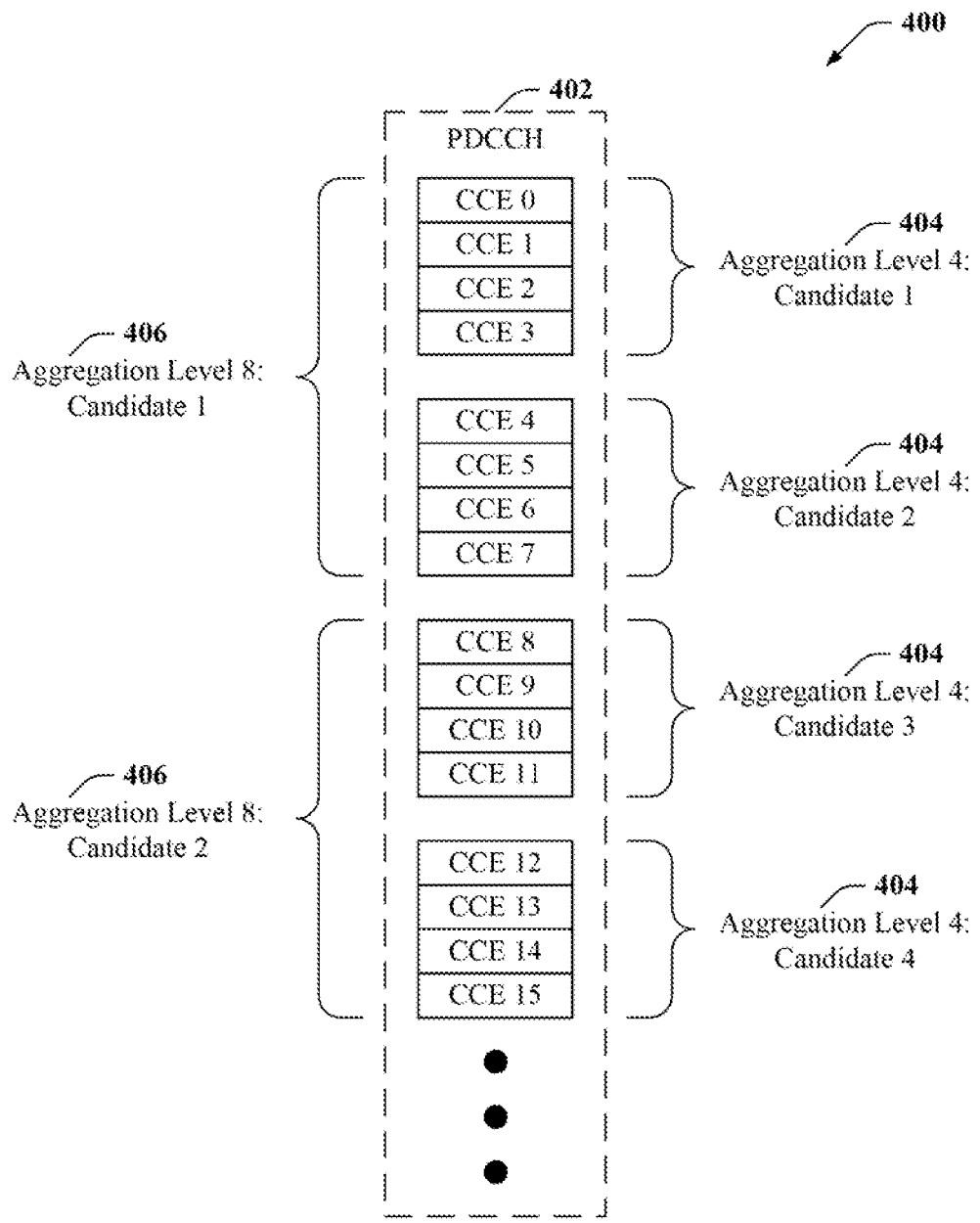
FIG. 4 illustrates a set of exemplary aggregation levels associated with a search space.

The size of a search space, such as search space 302 of FIG. 3, or a set of CCE locations can be based upon an aggregation level. As noted earlier, the size of a DCI message can depend on the DCI format and the transmission bandwidth. The aggregation level specifies a number of logically or physically contiguous CCEs utilized to convey a single DCI payload. The common search space can include two possible aggregation levels, level-4 (e.g., 4 CCEs) and level-8 (e.g., 8 CCEs). In some systems, to reduce the computations that must be performed by a user equipment, aggregation level-4 of the common search space can be configured to accommodate a maximum of four DCI locations. Similarly, aggregation level-8 of the common search space can be configured to accommodate a maximum of 2 DCI locations. FIG. 4 provides an exemplary diagram of a common search space 400 on a PDCCH 402 that is configured to accommodate four aggregation level-4 candidates 404 and two aggregation level-8 candidates 406. Accordingly, there are a total of 6 candidates in the common search space 400 in the exemplary diagram of FIG. 4.

Figure 5:
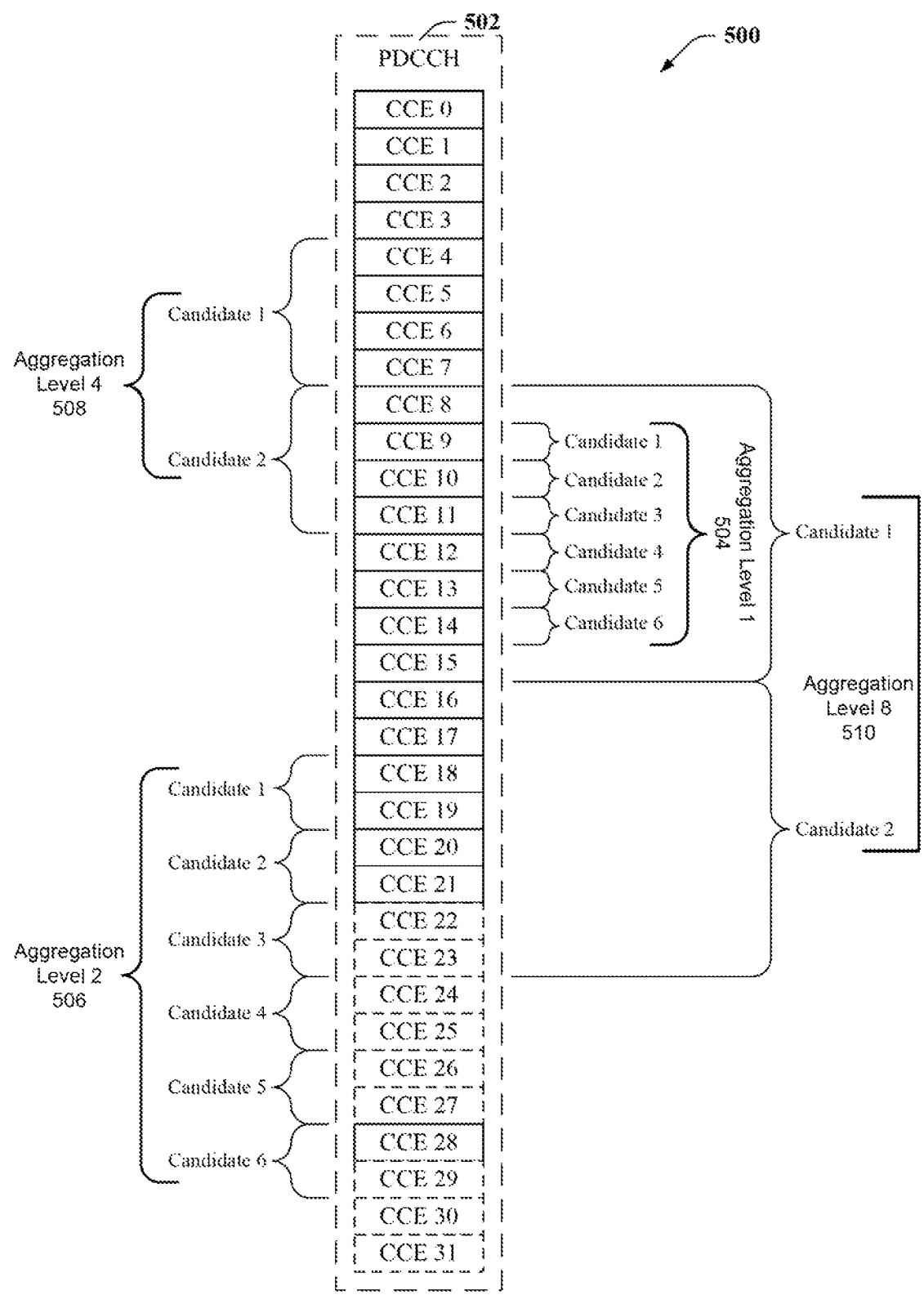
FIG. 5 illustrates another set of exemplary aggregation levels associated with a search space.

The UE-specific search space can be configured to include four aggregation levels: 1, 2, 4 or 8, corresponding to 1, 2, 4 and 8 CCEs, respectively. FIG. 5 provides an exemplary diagram of a UE-specific search space 500 on a PDCCH 502 that is configured to accommodate six aggregation level-1 candidates 504, six aggregation level-2 candidates 506, two aggregation level-4 candidates 508 and two aggregation level-8 candidates 510. Accordingly, there are a total of 16 candidates in the UE-specific search space 500 in the exemplary diagram of FIG. 5.

It should be noted in the example of FIG. 5 that the starting CCE indices for the four aggregation levels are different and follow a so-called "tree-structure" used in LTE Rel-8. That is, for aggregation level L, the starting CCE index is always an integer multiples of L. Within each aggregation level, the search space is logically contiguous. The starting CCE index for each aggregation level can also depend on time (i.e., subframe number). In other contemplated embodiments, the starting CCE indices for each aggregation level may be the same or different.

Further, as discussed earlier, for a given UE, the UE-specific search space is a subset of the set $\{0, N_{CCE}-1\}$, where $N_{CCE}$ is the total number of available CCEs. In the example shown in FIG. 3, $N_{CCE}=32$. For example, due to the "tree-structure" and potentially different starting CCE indices for different aggregation levels, in a subframe, a UE may have CCE 9 as the starting CCE index for aggregation level 1, CCE 18 for aggregation level 2, CCE 4 for aggregation level 4, and CCE 8 for aggregation level 8. Since the UE-specific search space for each aggregation level is contiguous, the 2 candidates for aggregation level 4 for the UE are CCEs $\{4, 5, 6, 7\}$ and CCEs $\{8, 9, 10, 11\}$. It should be further noted that the common search space 400 of FIG. 4 and the UE-specific search space 500 of FIG. 5 are provided to facilitate the understanding of the underlying concepts associated with the disclosed embodiments. Therefore, it should be understood that common and UE-specific search spaces with different number and configurations of candidate locations may be configured and used in accordance with the disclosed embodiments.

Each candidate in the common search space and UE-specific search space represents a possible DCI transmission. If, for example, the DCI is for a specific user equipment, the CRC may be masked with a cell radio network temporary identifier (C-RNTI). If the DCI contains paging information or system information, for example, the CRC is masked with a paging RNTI (P-RNTI) or a system-information RNTI (SI-RNTI). In other examples, additional RNTIs or other codes may be used for masking the CRC. As noted earlier, a user equipment conducts a blind decode to discover the location of the control information. For instance, in the example UE-specific search space 500 that is depicted in FIG. 5, a user equipment may conduct up to 16 decode attempts to determine which of the UE-specific candidate locations 504, 506, 508, 510 (if any) contain the DCI information associated with that user equipment. Additional decoding attempts may be needed due to additional RNTIs, DCI formats and multiple PDCCH candidates.

In some embodiments, the number of DCI blind decodes can be limited by configuring each user equipment (e.g., via higher layers using RRC signaling) to operate in one of several transmission modes in a semi-static manner. Table 2 provides an exemplary listing of different transmission modes. It should be noted that the disclosed embodiments can also be implemented in conjunction with other transmission modes that are not listed in Table 2.

TABLE 2

Exemplary Transmission Modes

| Transmission Mode Number | Description |
| --- | --- |
| 1 | Single Antenna Port - Port 0 |
| 2 | Transmit Diversity |
| 3 | Open-Loop Spatial Multiplexing |
| 4 | Closed-Loop Spatial Multiplexing |
| 5 | Multi User MIMO |
| 6 | Closed-Loop Rank 1 Precoding |
| 7 | Single Antenna Port - Beam Forming with UE-Specific Reference Signal |
| 8 | Single- or Dual-Layer Transmission with UE-Specific Reference Signal |

In one embodiment, each transmission mode may be associated with two downlink DCI formats of different sizes, one of which is always DCI format 1A. In this example, the DCI formats 0 and 1A can be forced to be of the same size (e.g., via zero-padding, if needed, as described above). Therefore, each transmission mode has a maximum of two associated DCI format sizes: one corresponding to formats 0/1A and the other corresponding to another DCI format. Using the common and user-specific search spaces that are illustrated in FIGS. 3 through 5, the maximum number of blind decodes can be calculated as: (2 DCI sizes)×(6+16 search candidates)=44. In another embodiment, in order to support UL MIMO, a third DCI format size may be introduced in the UE-specific search space, such that the maximum number of blind decodes becomes (2 DCI sizes)×6+(3 DCI sizes)×16=60. It should be noted that the maximum number of decode attempts can be generalized as: $N_{DCI}$=(total number of DCI sizes)×(number of search candidates).

Table 3 provides an exemplary listing of seven transmission modes and associated DCI formats. It should be noted that the listing in Table 3 is only provided to facilitate the understanding of the underlying concepts. However, the disclosed embodiments are equally applicable to additional transmission modes and/or DCI format configurations associated with both the uplink and downlink transmissions.

TABLE 3

Exemplary Transmission Modes and Associated DCI Formats

| Transmission Mode Number | First DCI Format(s) | Second DCI Format |
| --- | --- | --- |
| 1 | 0 and 1A | 1 |
| 2 | 0 and 1A | 1 |
| 3 | 0 and 1A | 2A |
| 4 | 0 and 1A | 2 |
| 5 | 0 and 1A | 1D |
| 6 | 0 and 1A | 1B |
| 7 | 0 and 1A | 1 |

In the exemplary listing of Table 3, DCI formats 0 and 1A (which both have the same size) are always selected as one of the possible DCI formats for all transmission modes. However, each transmission mode is also associated with another DCI format that can vary based on the transmission mode. For example, DCI format 2A can be associated with transmission mode 3, DCI format 1B can be associated with transmission mode 6 and DCI format 1 can be associated with transmission modes 1, 2 and 7. The listing of Table 3 further illustrates that two or more of the transmission modes can have identical DCI formats. For example, in the exemplary listing of Table 3, transmission modes 1, 2 and 7 are all associated with DCI formats 0/1A and DCI format 1.

The number of decodes associated with a blind decode scheme can increase in systems where multiple component carriers (CCs) are used. In some systems, multiple carriers may be used to increase the overall system bandwidth. For example, two 10 MHz component carriers and four 20 MHz component carriers can be aggregated to extend the bandwidth of an LTE system to 100 MHz. Such component carriers may span a contiguous portion of the spectrum or reside on non-contiguous portions of the spectrum.

Figure 6:
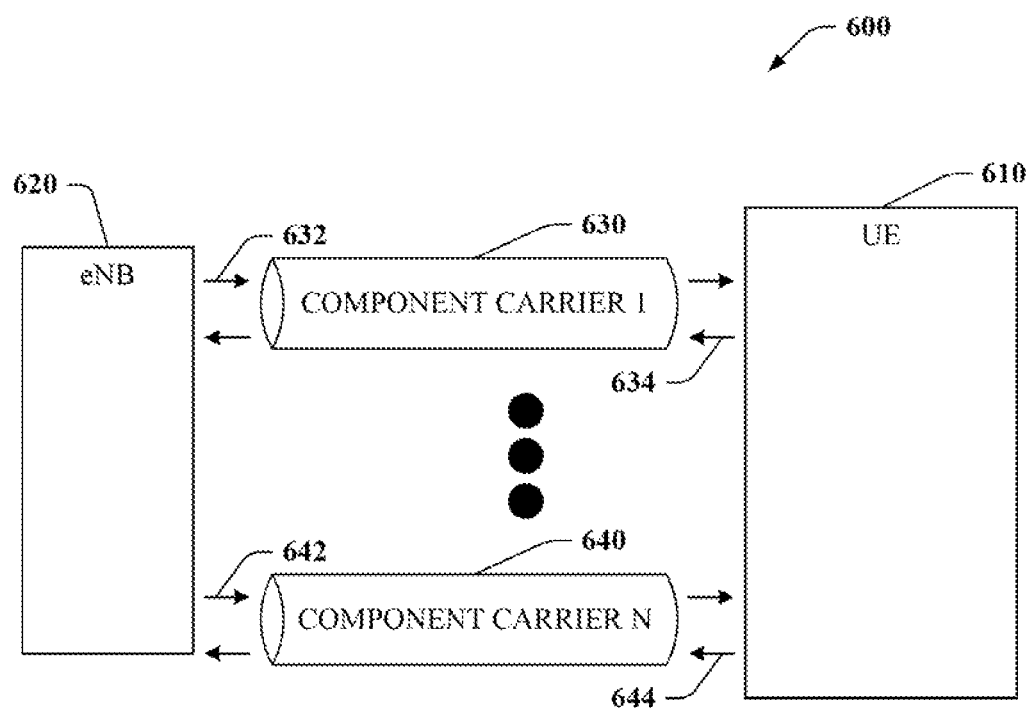
FIG. 6 illustrates a system within which various embodiments may be implemented.

FIG. 6 illustrates a system 600 that can be used in accordance with the disclosed embodiments. The system 600 can include a user equipment 610, which can communicate with an evolved Node B (eNB) 620 (e.g., a base station, access point, etc.) one or more component carriers 1 through N ($CC_1$-$CC_N$). While only one user equipment 610 and one eNB 620 are illustrated in FIG. 6, it will be appreciated that the system 600 can include any number of user equipment 610 and/or eNBs 620. The eNB 620 can transmit information to the user equipment 610 over forward (downlink) channels 632 through 642 on component carriers $CC_1$ through $CC_N$. In addition, the user equipment 610 can transmit information to the eNB 620 over reverse (uplink) channels 634 through 644 on component carriers $CC_1$ though $CC_N$. In describing the various entities of FIG. 6, as well as other figures associated with some of the disclosed embodiments, for the purposes of explanation, the nomenclature associated with a 3GPP LTE or LTE-A wireless network is used. However, it is to be appreciated that the system 600 can operate in other networks such as, but not limited to, an OFDMA wireless network, a CDMA network, a 3GPP2 CDMA2000 network and the like.

In LTE-A based systems, the user equipment 610 can be configured with multiple component carriers utilized by the eNB 620 to enable a wider overall transmission bandwidth. As illustrated in FIG. 6, the user equipment 610 can be configured with "component carrier 1" 630 through "component carrier N" 640, where N is an integer greater than or equal to one. While FIG. 6 depicts two component carriers, it is to be appreciated that the user equipment 610 can be configured with any suitable number of component carriers and, accordingly, the subject matter disclosed herein and the claims are not limited to two component carriers. In one example, some of the multiple component carriers can be LTE Rel-8 carriers. Thus, some of the component carrier can appear as an LTE Rel-8 carrier to a legacy (e.g., an LTE Rel-8 based) user equipment. Component carrier 630 through 640 can include respective downlinks 632 through 642 as well as respective uplinks 634 through 644.

In multi-carrier operations, the DCI messages associated with different user equipments can be carried on a plurality of component carriers. For example, the DCI on a PDCCH can be included on the same component carrier that is configured to be used by a user equipment for PDSCH transmissions (i.e., same-carrier signaling). Alternatively, or additionally, the DCI may be carried on a component carrier different from the target component carrier used for PDSCH transmissions (i.e., cross-carrier signaling). For example, with reference to FIG. 6, a downlink assignment on "component carrier 1" 630 can be indicated to the user equipment 610 via PDCCH on "component carrier N" 640. Cross-carrier signaling facilitates the operations of heterogeneous networks where, for example, due to the time division multiplex (TDM) nature of the downlink control signaling structure, some of the component carriers can have unreliable control information transmissions due to frequency dependent propagation and/or interference characteristics. Therefore, in some examples, due to strong interference from neighboring cells, the transmission of control information may be advantageously carried on a different component carrier with less interference. In other examples, some of the component carriers may not be backward compatible or may not even carry control information. As a result, a different component carrier can be used to provide the control signaling.

In some embodiments, a carrier indicator field (CIF), which may be semi-statically enabled, may be included in some or all DCI formats to facilitate the transmission of PDCCH control signaling from a carrier other than the target carrier for PDSCH transmissions (cross-carrier signaling). In one example, the carrier indicator field comprises 1-3 bits that identify particular component carriers in a system that utilizes multiple component carriers. In another example, the carrier indicator field comprises a fixed 3 bits that identify particular component carriers in a system that utilizes multiple component carriers. In general, the number of CIF bits required is given by ceiling[$\log_2(N_{UE})$] if the carrier indicator (CI) is UE specific, where $N_{UE}$ is the number of carriers configured per UE. If the CI is cell specific (i.e., common to all UEs in the cell), then the number of bits required to support CIF is given by ceiling[$\log_2$ (M)], where M is the number of carriers configured for the cell. The inclusion of the carrier indicator field as part of the DCI allows a component carrier to be linked with another component carrier.

Figure 7:
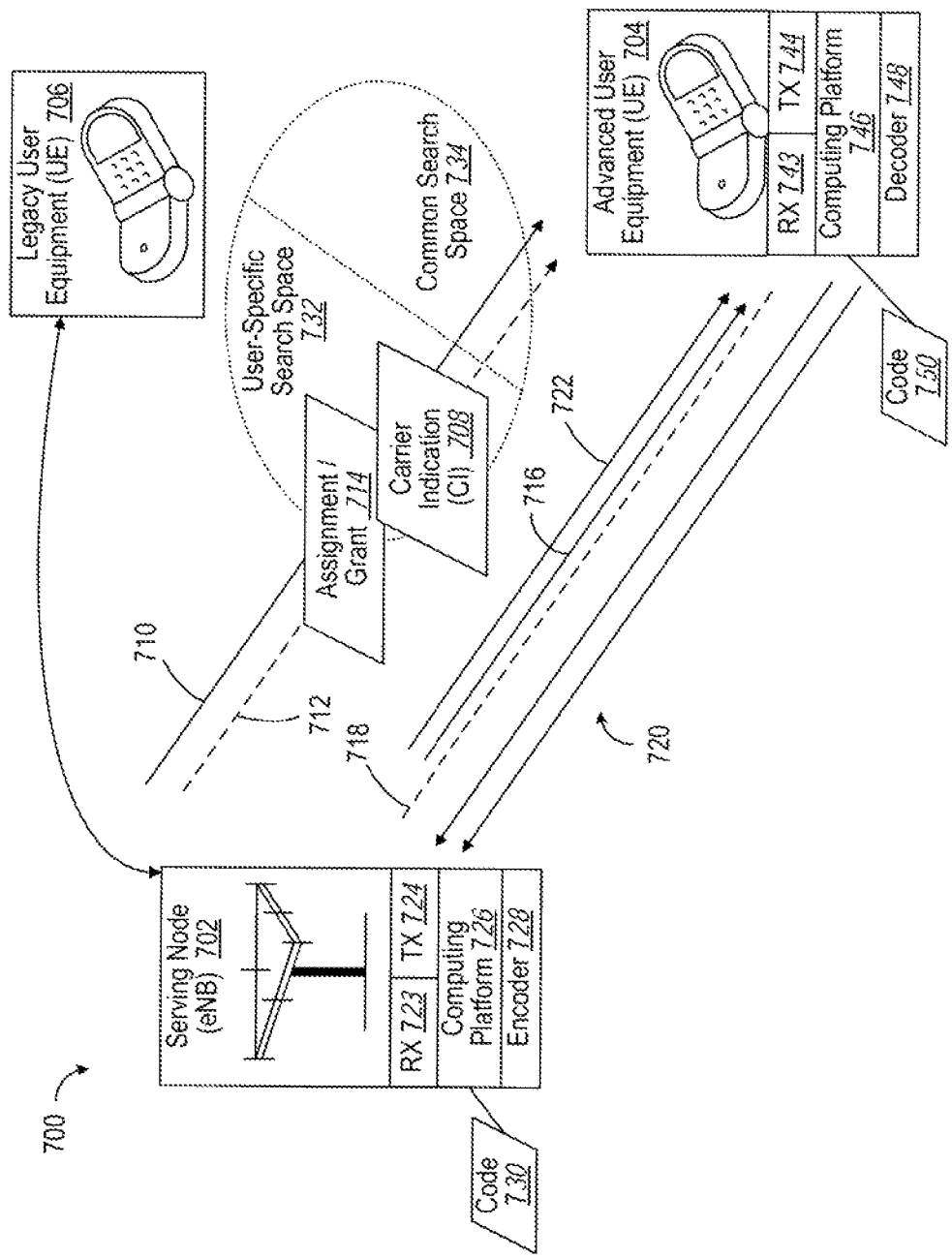
FIG. 7 illustrates a block diagram of a wireless communication system for cross-carrier signaling.

FIG. 7 illustrates a communications system 700 in one embodiment. In FIG. 7, communication system 700 includes a node, depicted as a serving evolved Base Node (eNB) 702 that schedules and supports multiple carrier operation for an advanced user equipment (UE) 704. In some instances, the eNB 702 can also support single carrier operation for a legacy UE 706. For the benefit of the advanced UE 704, the serving eNB 702 encodes a Carrier Indication (CI) 708 on first channel 710 on a first carrier 712 for scheduling an assignment or grant 714 for a second channel 716 on a second carrier 718. In a first instance, there is more than one uplink channel (i.e., second channel) 720 on the second carrier 718 that is designated by the CI 708. In a second instance, there is a downlink second channel 722 on the second carrier 718 that is designated by the CI 708.

In one aspect, the serving eNB 702 performs cross-carrier assignments in multiple carrier wireless communication using a receiver 723, transmitter 724, a computing platform 726 and an encoder 728. The computing platform 726 accesses a user-specific code 730 and generates the assignment or grant 714 according to the CI 708 for the more than one uplink channel 720 or downlink second channel 722 on the second carrier 718. The encoder 728 encodes at least one of a user-specific search space 732 using the user-specific code 730 and a common search space 734 to provide the CI 708. The transmitter 724 transmits the first channel 710 on the first carrier 712 containing the assignment or grant 714.

Similarly, the advanced UE 704 handles cross-carrier assignments in multiple carrier wireless communication using a receiver 743, a transmitter 744, a computing platform 746 and a decoder 748. The computing platform 746 accessing a user-specific code 750. The receiver 742 receives the first channel 710 on the first carrier 712. The decoder 748 decodes at least one of the user-specific search space 732 using the user-specific code 750 and the common search space 734 to detect the CI 708. The transmitter 744 or the receiver 742 utilize the assignment or grant 714 for the first channel 710 on the first carrier 712 according to the CI 708.

In an exemplary implementation, LTE-A supports multi-carrier operation. A UE may be configured with multiple carriers. Different carriers may experience different levels of interference. Also, some carriers may not be backward compatible with legacy UEs (e.g., LTE Rel-8) devices, and some even do not carry any control signals. As a result, it may be desirable to have cross-carrier control signaling such that one carrier can transmit PDCCH scheduling PDSCH transmissions over a different carrier.

One issue addressed by the system of FIG. 7 concerns implementation of a carrier indicator field at eNB 702, including whether the CIF is applied to unicast traffic only, broadcast traffic only, or both unicast and broadcast traffic, and the implications on the design of DCI formats for cross-carrier signaling in view of some systems for which DCI format 1A is present in both the common search space and the UE-specific search space and can be used to schedule both unicast traffic and broadcast traffic. Unicast traffic is point-to-point transmission between the eNB 702 and one of the UEs 704, 706. Broadcast traffic is a downlink only point-to-multipoint connection between the eNB 702 and multiple UEs 704, 706.

In one embodiment (Option I), the eNB 702 may signal cross-carrier operation by extending the LTE Rel-8 DCI formats with CIF bits. The eNB 702 can apply a CIF to DCI formats in the UE-specific search space only, using it with both downlink DCI formats configured for the specific downlink transmission mode, and with DCI format 0 for uplink scheduling. This may include defining new downlink DCI formats, 1A plus one other, and a new DCI format 0. The new DCI formats may be designated 1A' (1A prime), 1B', 1D', 2', 2A' and 0'. As a result, with this embodiment, the common search space uses DCI formats 1A/0 and 1C, and the UE specific search space uses new DCI formats 1A'/0' and 1B'/1D'/2'/2A'. It should be noted that the same design may also be applied to any other DCI formats in the UE-specific search space, e.g., DCI 2B supporting dual-layer beamforming, new DCI format(s) supporting UL MIMO operation, etc. Other embodiments described below may also be applicable to any other DCI formats in the UE-specific search space too.

In this embodiment, because the CIF is not included in the common search space, the three DCI formats 1A/0 and 1C can remain unchanged (i.e., LTE Rel-8 compatible) and may be used for single carrier broadcast traffic, and DCI formats 1A' and 0' can be used for cross-carrier unicast traffic. While this option does not support cross-carrier signaling for broadcast traffic via DCI formats, such signaling may be resolved by redesigning System Information Blocks (SIB) or Master Information Blocks (MIB) to include information for one or more other carriers, or by dedicated layer 3 (RRC) signaling.

In a variation of the first embodiment (Option IA), rather than extending the DCI formats with a CIF, the eNB 702 may re-use reserved bits in DCI format 1A for carrier indication when they are not needed, such as when the DCI is scrambled by a Paging RNTI (P-RNTI), System Information RNTI (SI-RNTI) or a Random Access RNTI (RA-RNTI) based scrambling code. For example, the Hybrid Automatic Repeat Request (HARQ) process number and/or the Downlink Assignment Index (TDD only) are reserved bits in LTE Rel-8 which may be used to embed the CIF. As a result, DCI format 1A' may have the same size as format 1A, but may still provide for cross-carrier signaling for broadcast traffic. The same DCI format design principle (i.e., an embedded CIF), may be applied to the other embodiments described below.

In another embodiment (Option II), the eNB 702 may apply the CIF to both the UE specific search space and the common search space. In this case, the CIF is applied to DCI formats 1A, 0 and 1C in the common search space, both downlink DCI formats configured for the specific transmission mode, and DCI format 0 for uplink scheduling in the UE specific search space. Related DCI formats 1A and one other format, and DCI format 0 are modified by CIF bits (by extension or embedding as described above), resulting in formats 1A', 1B'/1D'/2'/2A', 1C' and 0'. As a result, the common search space will use DCI formats 1A'/0' and 1C', and the UE-specific search space will use the same DCI formats as in Option I above (1A'/0', 1B'/1D'/2'/2A').

Compared with Option I, the Option II embodiment provides for the UE to have cross-carrier signaling in both the common search space and the UE-specific search space for both unicast and broadcast traffic. However, the Option II embodiment is not backward compatible with LTE Rel-8 as it includes modifications to DCI formats 1A and 1C for carrying broadcast traffic.

In another embodiment (Option III), the eNB 702 may apply the CIF to both the UE specific search space and the common search space, but may limit the use of CIF to DCI formats 1A/0 in the common search space (CIF is not applied to DCI format 1C). As with the Option II embodiment, the CIF can be applied to both downlink DCI formats configured for the specific downlink transmission mode, and to DCI format 0 for the uplink scheduling, in the UE specific search space. Related DCI formats 1A and one other format, and DCI format 0 are modified by CIF bits (by extension or embedding) resulting in formats 1A', 1B'/1D'/2'/2A' and 0'. DCI format 1C is not changed. As a result, the common search space includes DCI formats 1A' and 1C, and the DCI formats used in the UE specific search space are the same as for Options I and II (i.e., 1A'/0', 1B'/1D'/2'/2A').

Compared with Options I and II, the Option III embodiment provides for the UE to have cross-carrier signaling in both the common search space and in the UE specific search space for both unicast traffic and broadcast traffic (using DCI format 1A only). The Option III embodiment is also backward compatible with LTE Rel-8 via DCI format 1C, which remains unchanged.

In another embodiment (Option IV), the eNB 702 may apply a CIF to DCI formats in both the common search space and the UE specific search space: to DCI formats 1A, 0 and 1C in the common search space, to both downlink DCI formats configured for the specific downlink transmission mode, and to DCI format 0 for uplink scheduling in the UE specific search space. DCI formats 1A or 1C, or both 1A and 1C, may be maintained (i.e., unmodified) for backward compatibility for broadcast traffic and/or unicast traffic.

More particularly, based on the foregoing description of the Option IV embodiment, the following exemplary alternatives may be considered for common search space blind decoding, where there are 2 locations defined for CCE aggregation level 8 and 4 locations defined for CCE aggregation level 4:

Alternative 1: 3 DCI sizes 1A'/0', 1C', 1A→3(4+2)=18 blind decodes.

Alternative 2: 3 DCI sizes 1A'/0', 1C', 1C→3(4+2)=18 blind decodes.

Alternative 3: 3 DCI sizes 1A'/0', 1C, 1A→3(4+2)=18 blind decodes.

Alternative 4: 4 DCI sizes 1A'/0', 1C', 1A, 1C→4(4+2)=24 blind decodes.

For each of the four alternatives, the UE specific search space is the same as Options I and II with 32 blind decodes. Accordingly, under Option IV, either 50 (18+32) or 56 (24+32) blind decodes may be required, in comparison to 44 blind decodes in LTE Rel-8, to obtain the flexibility of cross-carrier signaling and backward compatibility with LTE Rel-8 unicast traffic or broadcast traffic, or both unicast and broadcast traffic.

Table 4 summarizes the embodiments described above:

TABLE 4

Summary of Embodiments

| Option | Common Search Space | UE-Specific Search Space |
|---|---|---|
| I | 1A/0, 1C | 1A', 1B'/1D'/2'/2A' |
| IA | 1A/0, 1C (reserved bits in 1A) | 1A', 1B'/1D'/2'/2A' |
| II | 1A'/0', 1C' | Same as above |
| III | 1A'/0', 1C | Same as above |
| IV | 1A'/0', 1C', 1A | Same as above |
|  | 1A'/0', 1C', 1C |  |
|  | 1A'/0', 1C, 1A |  |
|  | 1A'/0', 1C, 1A, 1C |  |

Other options for the common search space contemplated herein include, without limitation, {1A/0, 1C'} or {1A/0, 1C, 1C'}, where the CIF is only introduced to DCI format 1C instead of DCI format 1A/0.

Figure 8A:
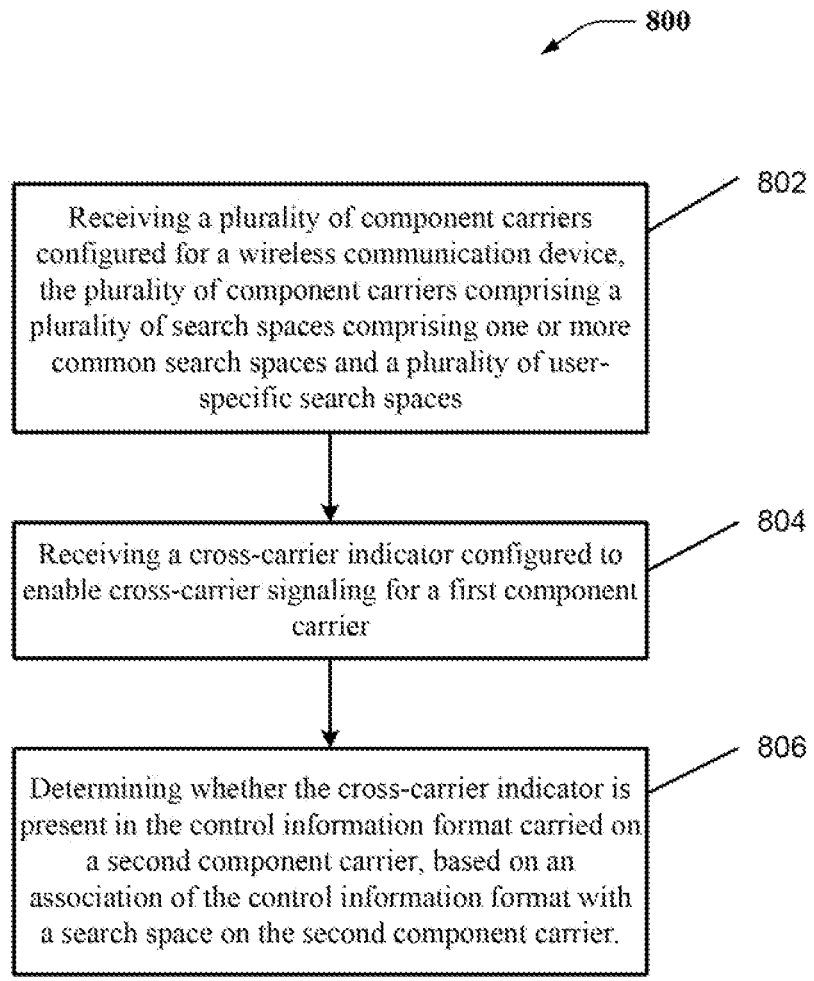
FIG. 8A is a flowchart illustrating a method in accordance with an exemplary embodiment.

FIG. 8A is a flowchart illustrating the operations of a method 800 that are carried out in accordance with an exemplary embodiment. The method 800 may be performed by a user equipment, such as the advanced UE 704 depicted in communication system 700.

The method 800 of FIG. 8A begins, at operation 802, by receiving a plurality of component carriers configured for a wireless communication device, the plurality of component carriers comprising a plurality of search spaces comprising one or more common search spaces and a plurality of user-specific search spaces. The method continues, at operation 804, by receiving a cross-carrier indicator configured to enable cross-carrier signaling for a first component carrier and, at operation 806, by determining whether the cross-carrier indicator is present in the control information format carried on a second component carrier, based on an association of the control information format with a search space on the second component carrier.

In one embodiment, cross-carrier operation may be configured and signaled to the UE by an upper layer of the communication protocol (e.g., the radio resource control layer) and the carrier indication may be constrained to 0 bits when there is no cross-carrier signaling, and 3 bits when cross-carrier signaling is implemented, where the use of a fixed number of bits (e.g., 3) reduces complexity by eliminating the need to signal and detect the number of CI bits being used. Such signaling may be specific to both uplink (UL) and/or downlink (DL) carrier assignments. Such signaling may be specific to a user equipment. Additionally, such signaling may be specific to an individual component carrier. It is important that there is a common interpretation between the upper layer scheduler and the UE with respect to the meaning of the carrier indicator. Table 5, below, illustrates an example of how the CI bits might be mapped to designated component carriers in a set of five (5) component carriers for a user equipment, when scheduling data transmissions on these five (5) component carriers for the user equipment is carried by the first component carrier. It will be appreciated that the bit map illustrated in Table 5 is exemplary and that other bit maps are possible.

TABLE 5

Exemplary CIF Bit-Mapping

| CIF | CARRIER ASSIGNMENTS |
|---|---|
| 000 | Single Carrier (Carrier 1) |
| 001 | Carrier 2 |
| 010 | Carrier 3 |
| 011 | Carrier 4 |
| 100 | Carrier 5 |

The UE carrier configuration may include a unique identifier of each carrier that can be used for the carrier identification. Also, to enable the flexibility to address more carriers than can be directly addressed by the 3-bit indicator, the carrier indexing can be specific to the carrier of the PDCCH that makes the assignments. For example, if there are 10 carriers, the UE may address the first five carriers based on one PDCCH in a first carrier and the other five carriers based on another PDCCH in a second carrier. Also, by limiting the cross-carrier signaling to specific carrier subsets, the total number of blind decodes can be limited.

As described above, with respect to the details of incorporating a CIF within the various DCI formats, the CI is generally applicable to all DCI formats that can carry UE specific UL or DL assignments. DCI formats 0, 1, 1A, 1B, 1D, 2 and 2A are used for UE specific assignments with C-RNTI scrambling, and can include the CIF for cross-carrier operation. DCI formats 1C, 3, and 3A are not used for UE-specific purposes and are located in the common search space. In order to provide for backward compatibility with LTE Rel-8 UEs that will use the same common search spaces, DCI formats 1C, 3 and 3A may not include a CIF. However, in LTE Rel-8, DCI formats 0 and 1A are used in both the common and UE specific search spaces. To insure backward compatibility with LTE Rel-8, for DCI formats in the common search space, DCI formats 0 and 1A with a carrier indicator can be distinguished from DCI formats 0 and 1A without a carrier indicator by the specific RNTI used for CRC scrambling. For example, DCI formats 0 and 1A with a carrier indicator could have a CRC scrambled exclusively by C-RNTI, while DCI formats 0 and 1A without a carrier indicator could have a CRC scrambled, for example, with an SI-RNTI, a P-RNTI or an RA-RNTI.

In various embodiments, an LTE-A UE (e.g., UE 704) could attempt to decode DCI formats 0 and 1A, both with and without a CIF in the common search space. DCI formats 0 and 1A with C-RNTI based CRC scrambling would be assumed to include a CIF, while DCI formats 0 and 1A with SI/P/RA-RNTI based CRC scrambling would be assumed to not include a CIF. By doing so, the number of blind decodes is only increased by 6 (2 DCI sizes×3 RNTIs). However, the false alarm probability is not increased compared to LTE Rel-8. This is because the false alarm probability is not only a function of the number of blind decodes, but also a function of the number of RNTIs used for the de-scrambling operation. In this approach, the total number of de-coding operations is still maintained. Table 6 summarizes the relationships among DCI formats, CRC scrambling, search spaces and carrier indication described above.

TABLE 6

DCI Formats With Carrier Indicators

| DCI FORMAT | SCRAMBLING | SEARCH SPACE | CARRIER INDICTOR |
|---|---|---|---|
| 0, 1, 1A, 1B, 1D, 2, 2A | C-RNTI | UE Specific | YES |
| 1C, 3, 3A | SI/P/RA-RNTI | Common | NO |
| 0, 1A | TEMP C-RNTI, SI/P/RA-RNTI | Common | NO |
| 0, 1A | C-RNTI | Common | YES |

Figure 8B:
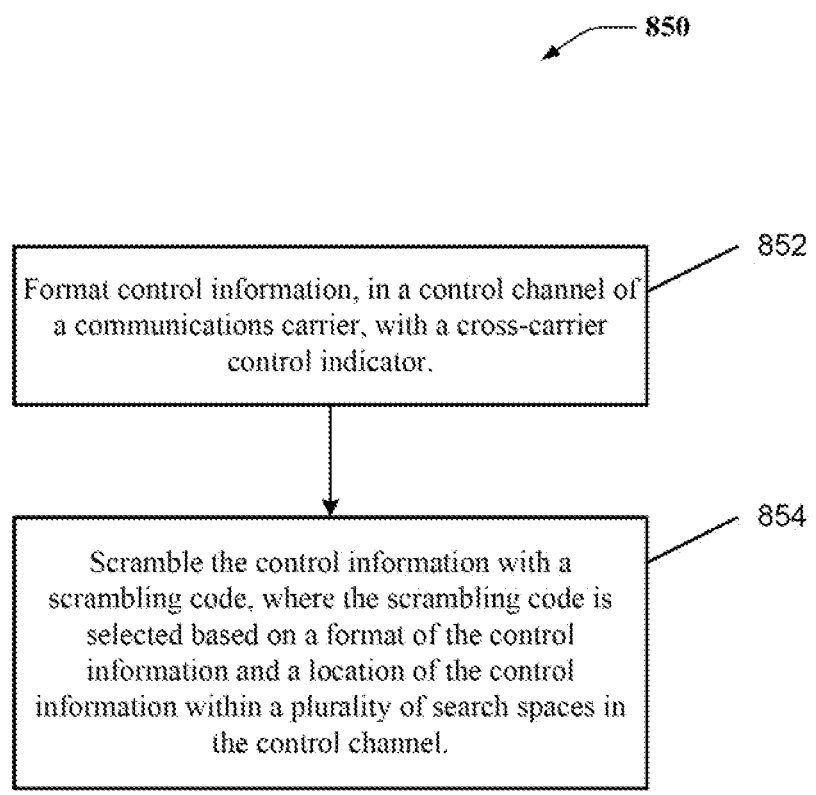
FIG. 8B is a flowchart illustrating a method in accordance with another exemplary embodiment.

FIG. 8B is a flowchart illustrating the operations of a method 850 in a communications system that are carried out in accordance with an exemplary embodiment. The method 850 may be performed by a base station, such as the serving node (eNB) 702 depicted in communication system 700.

The method 850 begins at operation 852 by formatting control information, in a control channel of a communications carrier, with a cross-carrier control indicator. The method concludes at operation 854 by scrambling the control information with a scrambling code, where the scrambling code is selected based on a format of the control information and a location of the control information within a plurality of search spaces in the control channel.

Figure 8C:
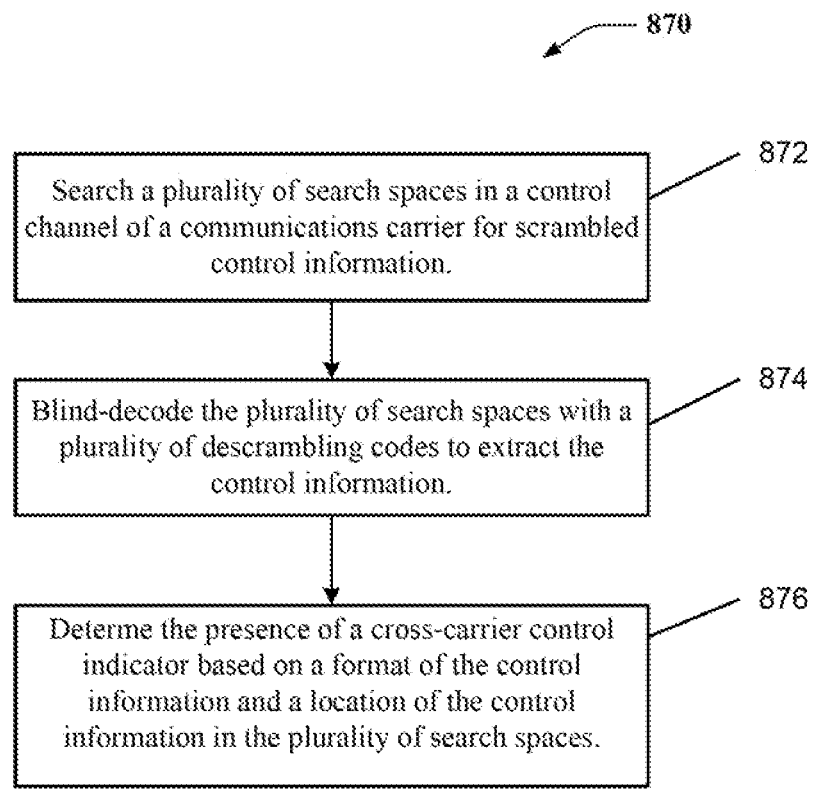
FIG. 8C is a flowchart illustrating a method in accordance with yet another exemplary embodiment.

FIG. 8C is a flowchart illustrating the operations of a method 870 in a UE that are carried out in accordance with an exemplary embodiment. The method 870 may be performed by a user equipment, such as the advanced UE 704 depicted in communication system 700.

The method 870 begins at operation 872 by searching a plurality of search spaces in a control channel of a communications carrier for scrambled control information. The method continues at operation 874 by blind-decoding the plurality of search spaces with a plurality of descrambling codes to extract the control information. The method concludes at operation 876 by determining the presence of a cross-carrier control indicator based on a format of the control information and a location of the control information in the plurality of search spaces.

For purposes of simplicity of explanation, the operations in FIGS. 8A, 8B and 8C are shown and described as a series of acts. However, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed embodiments.

As indicated above (see, e.g., Table 1), DCI formats 3 and 3A are size-matched with DCI formats 1A and 0, which means that modified DCI formats 3' and 3A' with carrier information can be defined to size-match DCI formats 1A' and 0'. The modifications can be made in the same way; size-matching via zero-padding or size-matching by defining a specific use for existing but unused reserve bits. The later approach is possible because DCI formats 3/3A are in the common search space and the CIF size in the common search space is preferably based on cell-specific multi-carrier configurations.

Alternatively, the CIF can be introduced in DCI formats 3/3A via the transmit power control (TPC) bits in those two DCI formats, such that the TPC commands can address not only the carrier in question, but other carriers as well. This cross-carrier power control can be useful under high interference conditions when the selected component carrier can deliver more reliable power control commands to a group of user equipments.

If carrier information (CI) is included in the 1A/1C DCI formats for broadcast, and the size of the CIF is allowed to vary, it would be beneficial to signal the carrier information as early as possible. The signaling can be explicit or implicit. One example of explicit signaling is to use reserved bits in the PBCH to signal the presence and/or the size of the CI. After PBCH decoding, the UE is aware of the CI field and can determine the PDCCH payload size to search for SIB/Paging decoding. For implicit signaling, UEs may perform blind decodes of PDCCH formats which are used to signal resource allocations for system information, paging and or random access responses. The presence and/or the size of the CI can be determined from the results of the blind decoding.

Alternatively, cross-carrier broadcast can be realized via a new SI-RNTI (or P/RA-RNTI) for PDCCH CRC scrambling (vs. explicit CI in PDCCH). The new SI-RNTI can be taken from reserved RNTIs (0000 and FFF4-FFFD, currently reserved in LTE Rel-8 for future use), or other RNTIs.

Yet another alternative is to use one PDCCH to signal the same broadcast content for two or more component carriers, at the expense of scheduling restrictions.

Figure 9:
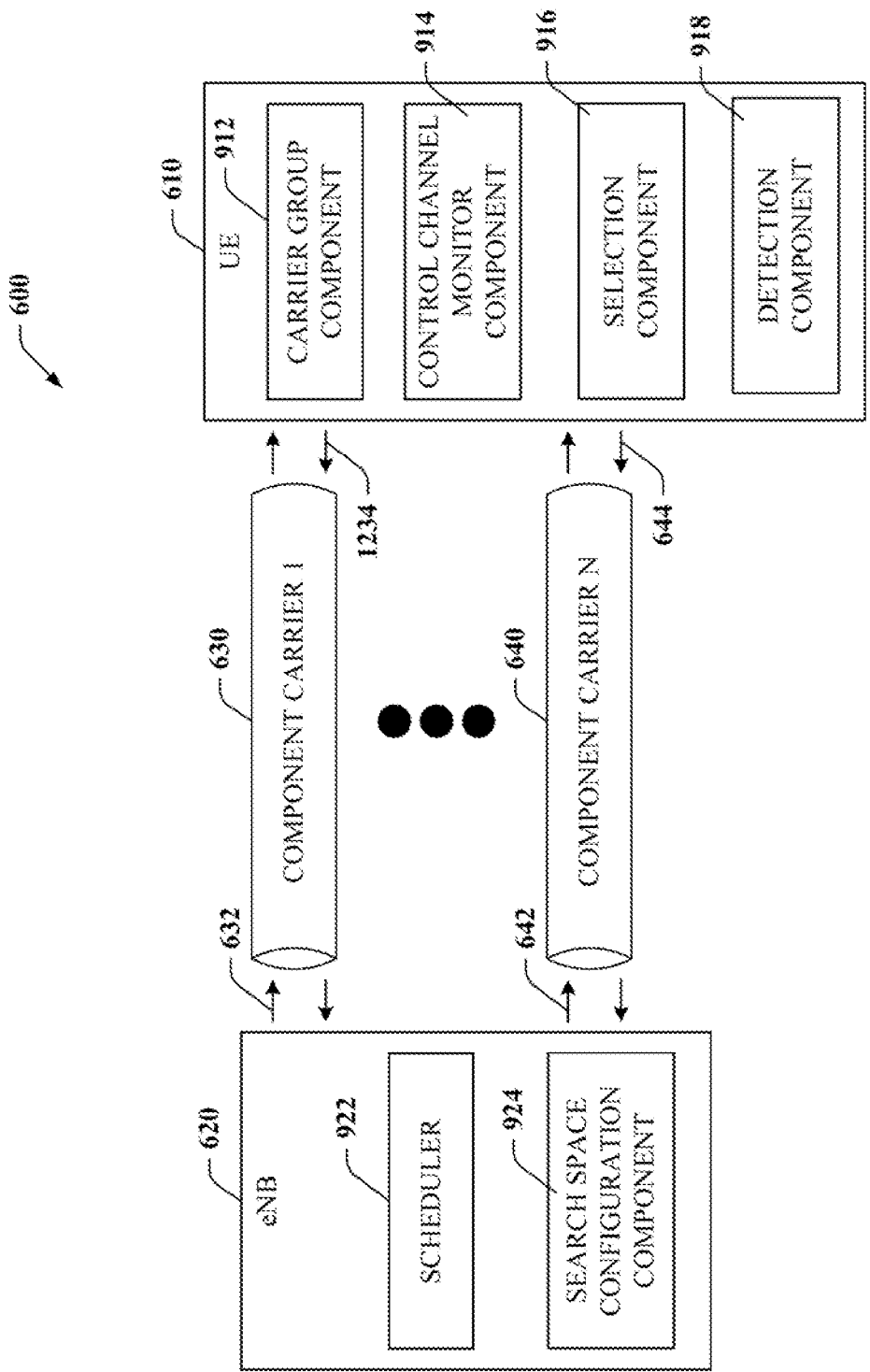
FIG. 9 illustrates a system within which various embodiments may be implemented.

FIG. 9 illustrates an exemplary system 600 capable of supporting the various operations described above. As discussed in connection with FIG. 6, the system 600 includes an eNB 620 that can transmit and/or receive information, signals, data, instructions, commands, bits, symbols and the like. FIG. 9 also illustrates a user equipment 610, that is in communication with the eNB 620 using "component carrier 1" 630 through "component carrier N" 640. The user equipment 610 can transmit and/or receive information, signals, data, instructions, commands, bits, symbols and the like. Moreover, although not shown, it is contemplated that the system 600 can include additional base stations and/or user equipment.

In some embodiments, the eNB 620 can include a scheduler 922 that allocates resources on a link (e.g., downlink or uplink) to the user equipment 610 and/or any other user equipment (not shown) that is served by the eNB 620. The scheduler 922 can select resource blocks (RBs) on one or more subframes that are intended to carry data associated with the user equipment 610. For example, the scheduler 922 can assign RBs of downlink subframes for data transmitted to the user equipment 610 and the scheduler 922 can assign RBs of uplink subframes for data transmitted by the user equipment 610. The allocated RBs can be indicated to the user equipment 610 via control channel signaling (e.g., control information messages) included on a control channel such as PDCCH. The eNB 620 may also include a search space configuration component 924 that can enable the configuration of search spaces associated with one or more control information messages. The search space configuration, component 924 can operate in association with one or more of the "component carrier 1" 630 through "component carrier N" 640. For example, the search space configuration component 924 can configure two or more search spaces to be shared among control information messages associated with two or more component carrier transmissions.

In some embodiments, the user equipment 610 that is shown in FIG. 9 can include a carrier group component 912 that can be configured to group of one or more component carriers. The carrier group component 912 can, for example, be configured to group the component carriers based on the DCI size of the control information carried on the component carriers. The carrier group component 912 can also be configured to group the component carriers based on the transmission mode used by the communication system. The user equipment 610 can also include a control channel monitor component 914 that allows the user equipment 610 to monitor the control channels of "component carrier 1" 630 through "component carrier N" 640. Moreover, a selection component 916 within the user equipment 610 can be configured to allow the selection of a group of component carriers, as well as the selection of a particular component carrier within the group of component carriers. The user equipment 610 can also include a detection component 918 that enables the detection of the control information messages that are carried on the control channels of "component carrier 1" 630 through "component carrier N" 640. For example, the detection component 918 can be configured to conduct a blind decode of the DCI messages within a search space.

Figure 10:
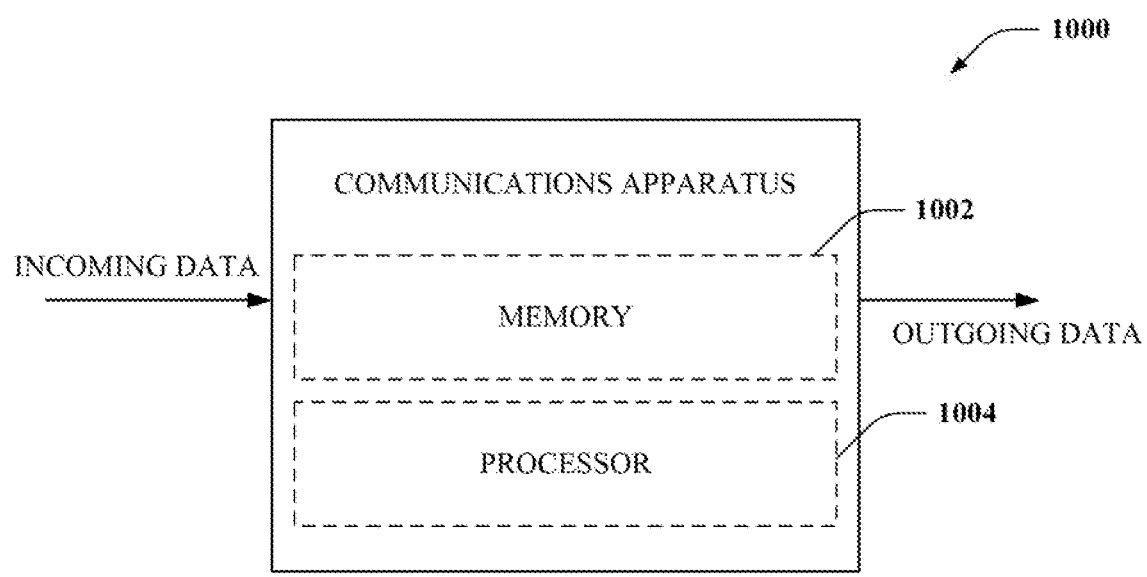
FIG. 10 illustrates an apparatus within which various embodiments may be implemented.

FIG. 10 illustrates an apparatus 1000 within which the various disclosed embodiments may be implemented. In particular, the apparatus 1000 that is shown in FIG. 103 may comprise at least a portion of a base station or at least a portion of a user equipment (such as the eNB 620 and the user equipment 610 that are depicted in FIG. 6 and FIG. 10) and/or at least a portion of a transmitter system or a receiver system (such as the transmitter system 210 and the receiver system 250 that are depicted in FIG. 2). The apparatus 1000 that is depicted in FIG. 10 can be resident within a wireless network and receive incoming data via, for example, one or more receivers and/or the appropriate reception and decoding circuitry (e.g., antennas, transceivers, demodulators and the like). The apparatus 1000 that is depicted in FIG. 10 can also transmit outgoing data via, for example, one or more transmitters and/or the appropriate encoding and transmission circuitry (e.g., antennas, transceivers, modulators and the like). Additionally, or alternatively, the apparatus 1000 that is depicted in FIG. 10 may be resident within a wired network.

FIG. 10 further illustrates that the apparatus 1000 can include a memory 1002 that can retain instructions for performing one or more operations, such as signal conditioning, analysis and the like. Additionally, the apparatus 1000 of FIG. 10 may include a processor 1004 that can execute instructions that are stored in the memory 1002 and/or instructions that are received from another device. The instructions can relate to, for example, configuring or operating the apparatus 1000 or a related communications apparatus. It should be noted that while the memory 1002 that is depicted in FIG. 10 is shown as a single block, it may comprise two or more separate memories that constitute separate physical and/or logical units. In addition, the memory while being communicatively connected to the processor 1004, may reside fully or partially outside of the apparatus 1000 that is depicted in FIG. 10. It is also to be understood that one or more components, such as the scheduler 1022, the search space configuration component 1024, the carrier group component 1012, the control channel monitor component 1014, the selection component 1016 and/or the detection component 1018 that are shown in FIG. 10, can exist within a memory such as memory 1002.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1000 of FIG. 10 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. Therefore, the disclosed embodiments can be implemented on non-transitory computer readable media. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques. The disclosed embodiments can also be used in conjunction with systems that use multiple component carriers. For example, the disclosed embodiments can be used in conjunction with LTE-A systems.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 610 FIG. 12). In the alternative, the processor and the storage medium may reside as discrete components in a user equipment (e.g., 610 FIG. 12). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for wireless communication performed by a user equipment (UE), comprising:
 receiving a plurality of component carriers configured for a wireless communication device, the plurality of component carriers comprising a plurality of search spaces comprising one or more common search spaces and a plurality of user- specific search spaces;
 receiving a cross-carrier configuration comprising an indicator of cross-carrier operation for a first component carrier of the plurality of component carriers; and
 determining, based on the cross-carrier configuration, whether control information for the UE is present in a control information format carried on a second component carrier by decoding the plurality of search spaces according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

2. The method of claim 1, wherein the first component carrier and the second component carrier are different component carriers.

3. The method of claim 1, wherein the control information format is configured to control downlink grants.

4. The method of claim 3, wherein the second set of control information formats comprises at least LTE Rel-8 and Rel-9 DCI formats 1, 1A, 1B, 1C, 1D, 2, 2A and 2B transmitted via a physical downlink control channel (PDCCH).

5. The method of claim 1, wherein the control information format is configured to control uplink grants.

6. The method of claim 5, wherein the first set of control information formats comprises at least LTE Rel-8 and Rel-9 DCI formats 0 and 1A transmitted via a physical downlink control channel (PDCCH).

7. The method of claim 1, wherein each DCI format in the first set of control information formats comprises a DCI format without a carrier indicator.

8. The method of claim 1, wherein the carrier indicator is located in control information formats in each of the plurality of user-specific search spaces.

9. The method of claim 1, wherein the carrier indicator is used for unicast traffic and not used for broadcast traffic.

10. The method of claim 1, wherein the carrier indicator comprises a carrier indicator field (CIF) consisting of three bits.

11. The method of claim 10, wherein the CIF is located at a beginning of the control information.

12. The method of claim 10, wherein the CIF is user specific and comprises a distinct value for each component carrier.

13. The method of claim 10, wherein the CIF is component carrier specific and values of the CIF for two or more component carriers comprise a same value if the control information for the two or more component carriers are located on different component carriers.

14. The method of claim 1, wherein the first set of control information formats includes DCI formats of two different sizes without carrier indicators, and the second set of control information formats includes DCI formats of at least two different sizes with carrier indicators, wherein cross-carrier control is enabled for unicast traffic and cross-carrier control is not enabled for broadcast traffic via carrier indicators.

15. The method of claim 1, wherein the first set of control information formats includes a second DCI format with a carrier indicator.

16. The method of claim 1, wherein the first set of control information formats includes the first DCI format with a carrier indicator.

17. The method of claim 1, wherein each control information format of the second set of control information formats comprises a DCI format with a carrier indicator.

18. The method of claim 1, wherein the first set of control information formats includes DCI formats of three sizes, comprising DCI formats of two sizes with carrier indicators and a DCI format of a third size without a carrier indicator, and the second set of control information formats includes DCI formats of at least two different sizes with carrier indicators, wherein the method is backward compatible with LTE Rel-8 broadcast traffic and unicast traffic.

19. The method of claim 1, wherein the first set of control information formats includes DCI formats of four sizes, comprising DCI format of a first two sizes with carrier indicators and DCI formats of a second two sizes without carrier indicators, and the second set of control information formats includes DCI formats of at least two different sizes with carrier indicators, wherein the method is backward compatible with LTE Rel-8 broadcast traffic and unicast traffic.

20. An apparatus for wireless communication, comprising:
means for receiving a plurality of component carriers configured for a wireless communication device, the plurality of component carriers comprising a plurality of search spaces comprising one or more common search spaces and a plurality of user- specific search spaces;
means for receiving a cross-carrier configuration comprising an indicator of cross-carrier operation for a first component carrier of the plurality of component carriers; and
means for determining, based on the cross-carrier configuration, whether control information for the apparatus is present in a control information format carried on a second component carrier by decoding the plurality of search spaces according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

21. An apparatus for wireless communication by a user equipment (UE), comprising:
a processor; and
a memory comprising processor executable code that, when executed by the processor, configures the apparatus to:
receive a plurality of component carriers configured for a wireless communication device, the plurality of component carriers comprising a plurality of search spaces comprising one or more common search spaces and a plurality of user-specific search spaces;
receive a cross-carrier configuration comprising an indicator of cross-carrier operation for a first component carrier of the plurality of component carriers; and
determine, based on the cross-carrier configuration, whether control information for the UE is present in a control information format carried on a second component carrier by decoding the plurality of search spaces according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

22. The apparatus of claim 21, wherein the first component carrier and the second component carrier are different component carriers.

23. The apparatus of claim 21, wherein the control information format is configured to control downlink grants.

24. The apparatus of claim 21, wherein the second set of control information formats comprises at least LTE Rel-8 and Rel-9 DCI formats 1,1A, 1B, 1C, 1D, 2, 2A and 2B transmitted via a physical downlink control channel (PDCCH).

25. The apparatus of claim 21, wherein the control information format is configured to control uplink grants.

26. The apparatus of claim 21, wherein the first set of control information formats comprises at least LTE Rel-8 and Rel-9 DCI formats 0 and 1A transmitted via a physical downlink control channel (PDCCH).

27. The apparatus of claim 21, wherein each DCI format in the first set of control information formats comprises a DCI format without a carrier indicator.

28. The apparatus of claim 21, wherein the carrier indicator is located in control information formats in each of the plurality of user-specific search spaces.

29. The apparatus of claim 21, wherein the carrier indicator is used for unicast traffic and not used for broadcast traffic.

30. The apparatus of claim 21, wherein the carrier indicator comprises a carrier indicator field (CIF) consisting of three bits.

31. The apparatus of claim 30, wherein the CIF is located at a beginning of the control information.

32. The apparatus of claim 30, wherein the CIF is user specific and comprises a distinct value for each component carrier.

33. The apparatus of claim 30, wherein the CIF is component carrier specific and values of the CIF for two or more component carriers comprise a same value if the control information for the two or more component carriers are located on different component carriers.

34. The apparatus of claim 21, wherein the first set of control information formats includes DCI formats of two different sizes without carrier indicators, and the second set of control information formats includes DCI formats of at least two different sizes with carrier indicators, wherein cross-carrier control is enabled for unicast traffic and cross-carrier control is not enabled for broadcast traffic via carrier indicators.

35. The apparatus of claim 21, wherein the first set of control information formats includes a second DCI format with a carrier indicator.

36. The apparatus of claim 21, wherein the first set of control information formats includes the first DCI format with a carrier indicator.

37. The apparatus of claim 21, wherein each control information format of the second set of control information formats comprises a DCI format with a carrier indicator.

38. The apparatus of claim 21, wherein the first set of control information formats includes DCI formats of three sizes, comprising DCI formats of two sizes with carrier indicators and a DCI format of a third size without a carrier indicator, and the second set of control information formats includes DCI formats of at least two different sizes with carrier indicators, wherein the method is backward compatible with LTE Rel-8 broadcast traffic and unicast traffic.

39. The apparatus of claim 21, wherein the first set of control information formats includes DCI formats of four sizes, comprising DCI format of a first two sizes with carrier indicators and DCI formats of a second two sizes without carrier indicators, and the second set of control information formats includes DCI formats of at least two different sizes with carrier indicators, wherein the method is backward compatible with LTE Rel-8 broadcast traffic and unicast traffic.

40. A computer program product for wireless communication by a user equipment (UE), embodied on a non-transitory computer readable storage medium, comprising:
    program code for receiving a plurality of component carriers configured for a wireless communication device, the plurality of component carriers comprising a plurality of search spaces comprising one or more common search spaces and a plurality of user-specific search spaces;
    program code for receiving a cross-carrier configuration comprising an indicator of cross-carrier operation for a first component carrier of a plurality of component carriers; and
    program code for determining, based on the cross-carrier configuration, whether control information for the UE is present in a control information format carried on a second component carrier by decoding the plurality of search spaces according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

41. A wireless communication method, comprising:
    transmitting a plurality of component carriers configured for a wireless communication device, the plurality of component carriers comprising a plurality of search spaces comprising one or more common search spaces and a plurality of user-specific search spaces; and
    transmitting, to a user equipment (UE), a cross-carrier configuration comprising an indicator of cross-carrier operation for a first component carrier of the plurality of component carriers; and
    transmitting control information for the UE in a control information format carried on a second component carrier, the control information encoded according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

42. The method of claim 41, wherein the first component carrier and the second component carrier are different component carriers.

43. The method of claim 41, wherein the control information format is configured to control downlink grants.

44. The method of claim 43, wherein the second set of control information formats comprises at least LTE Rel-8 and Rel-9 DCI formats 1, 1A, 1B, 1C, 1D, 2, 2A and 2B transmitted via a physical downlink control channel (PDCCH).

45. The method of claim 41, wherein the control information format is configured to control uplink grants.

46. The method of claim 45, wherein the first set of control information formats comprises at least LTE Rel-8 and Rel-9 DCI formats 0 and 1A transmitted via a physical downlink control channel (PDCCH).

47. The method of claim 41, wherein each DCI format in the first set of control information formats comprises a DCI format without a carrier indicator.

48. The method of claim 41, wherein the carrier indicator is located in control information formats in each of the plurality of user-specific search spaces.

49. The method of claim 41, wherein the carrier indicator is used for unicast traffic and not used for broadcast traffic.

50. The method of claim 41, wherein the carrier indicator comprises a carrier indicator field (CIF) consisting of three bits.

51. The method of claim 50, wherein the CIF is located at a beginning of the control information.

52. The method of claim 50, wherein the CIF is user specific and comprises a distinct value for each component carrier.

53. The method of claim 50, wherein the CIF is component carrier specific and values of the CIF for two or more component carriers comprise a same value if the control information for the two or more component carriers are located on different component carriers.

54. The method of claim 41, wherein the first set of control information formats includes DCI formats of two different sizes without carrier indicators, and the second set of control information formats includes DCI formats of at least two different sizes with carrier indicators, wherein cross-carrier control is enabled for unicast traffic and cross-carrier control is not enabled for broadcast traffic via carrier indicators.

55. The method of claim 41, wherein the first set of control information formats includes a second DCI format with a carrier indicator.

56. The method of claim 41, wherein the first set of control information formats includes the first DCI format with a carrier indicator.

57. The method of claim 41, wherein each control information format of the second set of control information formats comprises a DCI format with a carrier indicator.

58. The method of claim 41, wherein the first set of control information formats includes DCI formats of three sizes, comprising DCI formats of two sizes with carrier indicators and a DCI format of a third size without a carrier indicator, and the second set of control information formats includes DCI formats of at least two different sizes with carrier indicators, wherein the method is backward compatible with LTE Rel-8 broadcast traffic and unicast traffic.

59. The method of claim 41, wherein the first set of control information formats includes DCI formats of four sizes, comprising DCI format of a first two sizes with carrier indicators and DCI formats of a second two sizes without carrier indicators, and the second set of control information formats includes DCI formats of at least two different sizes with carrier indicators, wherein the method is backward compatible with LTE Rel-8 broadcast traffic and unicast traffic.

60. An apparatus for wireless communication, comprising:
  means for transmitting a plurality of component carriers configured for a wireless communication device, the plurality of component carriers comprising a plurality of search spaces comprising one or more common search spaces and a plurality of user-specific search spaces;
  means for transmitting, to a user equipment (UE), a cross-carrier configuration comprising an indicator of cross-carrier operation for a first component carrier of the plurality of component carriers; and
  transmitting control information for the UE in a control information format carried on a second component carrier, the control information encoded according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

61. An apparatus for wireless communication, comprising:
  a processor; and
  a memory comprising processor executable code that, when executed by the processor, configures the apparatus to:
    transmit a plurality of component carriers configured for a wireless communication device, the plurality of component carriers comprising a plurality of search spaces comprising one or more common search spaces and a plurality of user-specific search spaces;
    transmit, to a user equipment (UE), a cross-carrier configuration comprising an indicator of cross-carrier operation for a first component carrier of the plurality of component carriers; and
    transmit control information for the UE in a control information format carried on a second component carrier, the control information encoded according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

62. The apparatus of claim 61, wherein the first component carrier and the second component carrier are different component carriers.

63. The apparatus of claim 61, wherein the control information format is configured to control downlink grants.

64. The apparatus of claim 61, wherein the second set of control information formats comprises at least LTE Rel-8 and Rel-9 DCI formats 1, 1A, 1B, 1C, 1D, 2, 2A and 2B transmitted via a physical downlink control channel (PDCCH).

65. The apparatus of claim 61, wherein the control information format is configured to control uplink grants.

66. The apparatus of claim 61, wherein the first set of control information formats comprises at least LTE Rel-8 and Rel-9 DCI formats 0 and 1A transmitted via a physical downlink control channel (PDCCH).

67. The apparatus of claim 61, wherein each DCI format in the first set of control information formats comprises a DCI format without a carrier indicator.

68. The apparatus of claim 61, wherein the carrier indicator is located in control information formats in each of the plurality of user-specific search spaces.

69. The apparatus of claim 61, wherein the carrier indicator is used for unicast traffic and not used for broadcast traffic.

70. The apparatus of claim 61, wherein the carrier indicator comprises a carrier indicator field (CIF) consisting of three bits.

71. The apparatus of claim 70, wherein the CIF is located at a beginning of the control information.

72. The apparatus of claim 70, wherein the CIF is user specific and comprises a distinct value for each component carrier.

73. The apparatus of claim 70, wherein the CIF is component carrier specific and values of the CIF for two or more component carriers comprise a same value if the control information for the two or more component carriers are located on different component carrier.

74. The apparatus of claim 61, wherein the first set of control information formats includes DCI formats of two different sizes without carrier indicators, and the second set of control information formats includes DCI formats of at least two different sizes with carrier indicators, wherein cross-carrier control is enabled for unicast traffic and cross-carrier control is not enabled for broadcast traffic via carrier indicators.

75. The apparatus of claim 61, wherein the first set of control information formats includes a second DCI format with a carrier indicator.

76. The apparatus of claim 61, wherein the first set of control information formats includes the first DCI format with a carrier indicator.

77. The apparatus of claim 61, wherein each control information format of the second set of control information formats comprises a DCI format with a carrier indicator.

78. The apparatus of claim 61, wherein the first set of control information formats includes DCI formats of three sizes, comprising DCI formats of two sizes with carrier indicators and a DCI format of a third size without a carrier indicator, and the second set of control information formats includes DCI formats of at least two different sizes with carrier indicators, wherein the method is backward compatible with LTE Rel-8 broadcast traffic and unicast traffic.

79. The apparatus of claim 61, wherein the first set of control information formats includes DCI formats of four sizes, comprising DCI format of a first two sizes with carrier indicators and DCI formats of a second two sizes without carrier indicators, and the second set of control information formats includes DCI formats of at least two different sizes with carrier indicators, wherein the method is backward compatible with LTE Rel-8 broadcast traffic and unicast traffic.

80. A computer program product for wireless communication, embodied on a non-transitory computer readable storage medium, comprising:
  program code for transmitting a plurality of component carriers configured for a wireless communication device, the plurality of component carriers comprising a plurality of search spaces comprising one or more common search spaces and a plurality of user-specific search spaces; and
  program code for transmitting, to a user equipment (UE), a cross-carrier configuration comprising an indicator of cross-carrier operation for a first component carrier of the plurality of component carriers; and
  program code for transmitting control information for the UE in a control information format carried on a second component carrier, the control information encoded according to a first set of control information formats associated with the one or more common search spaces and a second set of control information formats associated with the plurality of user-specific search spaces, the first set of control information formats including at least a first downlink control information (DCI) format without a carrier indicator and the second set of control information formats including at least the first DCI format with a carrier indicator.

* * * * *